(12) United States Patent
Ding et al.

(10) Patent No.: US 12,130,818 B2
(45) Date of Patent: Oct. 29, 2024

(54) DATA MANAGEMENT APPARATUS, DATA MANAGEMENT SYSTEM, AND DATA MANAGEMENT METHOD

(71) Applicant: Hitachi, Ltd., Tokyo (JP)

(72) Inventors: Tianben Ding, Tokyo (JP); Mika Takata, Tokyo (JP); Toshihiko Kashiyama, Tokyo (JP); Hiroaki Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/216,709

(22) Filed: Jun. 30, 2023

(65) Prior Publication Data

US 2024/0012818 A1 Jan. 11, 2024

(30) Foreign Application Priority Data

Jul. 11, 2022 (JP) .................................. 2022-111468

(51) Int. Cl.
*G06F 16/24* (2019.01)
*G06F 16/242* (2019.01)
*G06F 16/2455* (2019.01)

(52) U.S. Cl.
CPC .... *G06F 16/24564* (2019.01); *G06F 16/2425* (2019.01)

(58) Field of Classification Search
CPC .................. G06F 16/24564; G06F 16/2425
See application file for complete search history.

(56) References Cited

U.S. PATENT DOCUMENTS

2008/0022136 A1* 1/2008 Mattsson ............ H04L 67/1006 713/194
2011/0225575 A1* 9/2011 Ningombam ....... G06F 11/3051 717/170
2013/0086067 A1 4/2013 Khoussainova

FOREIGN PATENT DOCUMENTS

| JP | 2017-182508 A | 10/2017 |
| JP | 2019-114241 A | 7/2019 |
| JP | 2021-197064 A | 12/2021 |
| JP | 2022-138161 A | 9/2022 |

* cited by examiner

*Primary Examiner* — Loc Tran
(74) *Attorney, Agent, or Firm* — MATTINGLY & MALUR, PC

(57) ABSTRACT

Provided are a data management apparatus, a data management system, and a data management method capable of creating an alternative for a useful query when a query for operating a database violates a data handling regulation of the database. When data scheduled to be generated based on the database by the query violates a rule that is the data handling regulation of the database, a data processing server generates an alternative query candidate to replace the query. The data processing server determines whether the alternative query candidate violates the rule by determining whether data scheduled to be generated based on the database by the alternative query candidate complies with the rule. When the alternative query candidate does not violate the rule, the data processing server proposes the alternative query candidate as an alternative query.

14 Claims, 26 Drawing Sheets

| AGE | GENDER | ILLNESS | |
|---|---|---|---|
| 31 | MALE | A01-1-1 | ... |
| 33 | MALE | A01-1-2 | ... |
| 36 | MALE | A01-2-1 | ... |
| 37 | MALE | A01-2-2 | ... |
| ... | ... | ... | ... |

RULE MANAGEMENT TABLE

| ID | DATABASE | DATA HANDLING REGULATION (RULE) |
|---|---|---|
| R11 | DB1 | PROHIBIT ACCESS TO DATA THAT DOES NOT SATISFY k VALUE ≥ 2 |
| R12 | DB1 | GROUP PEOPLE AGED 90 OR MORE INTO SAME GROUP |
| R13 | DB1 | PROHIBIT ACCESS TO DATA INCLUDING IDENTIFIER OF INDIVIDUAL |
| ... | ... | ... |

| | 24a | 24b | 24c | 24d | 24e | 24f | 24g | 24h |
|---|---|---|---|---|---|---|---|---|
| COLUMN OPERATION HISTORY MANAGEMENT TABLE | SOURCE | TABLE | COLUMN | COLUMN OPERATION | DATA USER | PROJECT | TARGET/KPI | QUERY EXECUTION TIME |
| | DB1 | PATIENT | AGE | As is | O1 | K CITY SOCIAL INSURANCE EXPENSES REDUCTION | REDUCE READMISSION RISK SCORE | 2022/2/1 12:53 |
| | DB1 | PATIENT | GENDER | COLUMN DROP | O1 | K CITY SOCIAL INSURANCE EXPENSES REDUCTION | REDUCE READMISSION RISK SCORE | 2022/2/1 12:53 |
| | DB1 | DIAGNOSE | ILLNESS CODE | EXTRACT IN AXX FORMAT | O1 | K CITY SOCIAL INSURANCE EXPENSES REDUCTION | REDUCE READMISSION RISK SCORE | 2022/2/1 12:53 |
| | ... | ... | ... | ... | ... | ... | ... | ... |
| | DB1 | PATIENT | AGE | ROUND-OFF BY INCREMENTS OF FIVE YEARS | O1 | K CITY SOCIAL INSURANCE EXPENSES REDUCTION | REDUCE READMISSION RISK SCORE | 2022/2/1 14:02 |
| | DB1 | PATIENT | GENDER | EXTRACT ONLY FEMALE OR MALE | O1 | K CITY SOCIAL INSURANCE EXPENSES REDUCTION | REDUCE READMISSION RISK SCORE | 2022/2/1 14:02 |
| | DB1 | DIAGNOSE | ILLNESS CODE | EXTRACT IN AXX-X FORMAT | O1 | K CITY SOCIAL INSURANCE EXPENSES REDUCTION | REDUCE READMISSION RISK SCORE | 2022/2/1 14:02 |
| | ... | ... | ... | ... | ... | ... | ... | ... |
| | DB2 | ... | ... | ... | O2 | H PREFECTURE HEALTHY LIFE IMPROVEMENT | BUILD HIGH-PRECISION NURSING CARE LEVEL PREDICTION AI MODEL | 2022/2/5 15:18 |
| | ... | ... | ... | ... | ... | ... | ... | ... |

24

FIG. 5B $$\Pr(a_r|b_r) = \frac{\sum_{i=1}^{n} I(R_i = a_r)}{\sum_{i=1}^{n} I(R'_i = b_r)} \quad \cdots \text{(1)}$$

$I(\cdot)$: INDICATOR FUNCTION. FUNCTION THAT IS 1 IF CONDITIONS ARE SATISFIED AND 0 OTHERWISE.
$n$: NUMBER OF RECORDS (NUMBER OF ROWS IN DATA TABLE).
$i$: DATA INDEX ($1 \leq i \leq n$).
$R_i$: VALUE TAKEN BY $i$-th DATA IN CERTAIN COLUMN (ITEM OR COLUMN).
$R'_i$: $D(R_i)$. VALUE TAKEN BY SAME DATA AS $R_i$ AFTER CORRESPONDING COLUMN OPERATION.
$a_r, b_r$: POSSIBLE VALUES FOR $R_i$ and $R'_i$.

CHANGE AMOUNT (ENTROPY) OF INFORMATION LOST (CHANGED) DUE TO COLUMN OPERATION $D$ $$H_C(R, D(R)) = -\sum_{i=1}^{n} \Pr(R_i|R'_i) \log_2 \Pr(R_i|R'_i) \quad \cdots \text{(2)}$$

$R$: ORIGINAL COLUMN BEFORE COLUMN OPERATION. $R = \{R_1, \ldots, R_n\}$.
$D(R)$: COLUMN AFTER COLUMN OPERATION. $D(R) = \{R'_1, \ldots, R'_n\}$.

COLUMN OPERATION TABLE

| COLUMN INTERNAL ORDER (26a1) | GENDER (26a2) | ILLNESS (26a3) | AGE (26a4) | ... |
|---|---|---|---|---|
| 1 | EXTRACT ONLY FEMALE OR MALE | EXTRACT IN AXX-X FORMAT | ROUND-OFF BY INCREMENTS OF FIVE YEARS | ... |
| 2 | COLUMN DROP | EXTRACT IN AXX FORMAT | ROUND-OFF BY INCREMENTS OF TEN YEARS | ... |
| 3 | As is | ROUND-OFF IN ONLY A01-2 | As is | ... |
| 4 | <Null> | As is | ... | ... |
| ... | ... | ... | ... | ... |

OPERATION TRIAL LIST

| TRIAL ORDER (26b1) | COLUMN OPERATION (26b2) |
|---|---|
| 1 | GENDER: EXTRACT ONLY FEMALE OR MALE |
| 2 | AGE: ROUND-OFF BY INCREMENTS OF FIVE YEARS |
| 3 | ILLNESS: EXTRACT IN AXX-X FORMAT |
| 4 | ILLNESS: EXTRACT IN AXX FORMAT |
| 5 | GENDER: COLUMN DROP |
| ... | ... |

26b

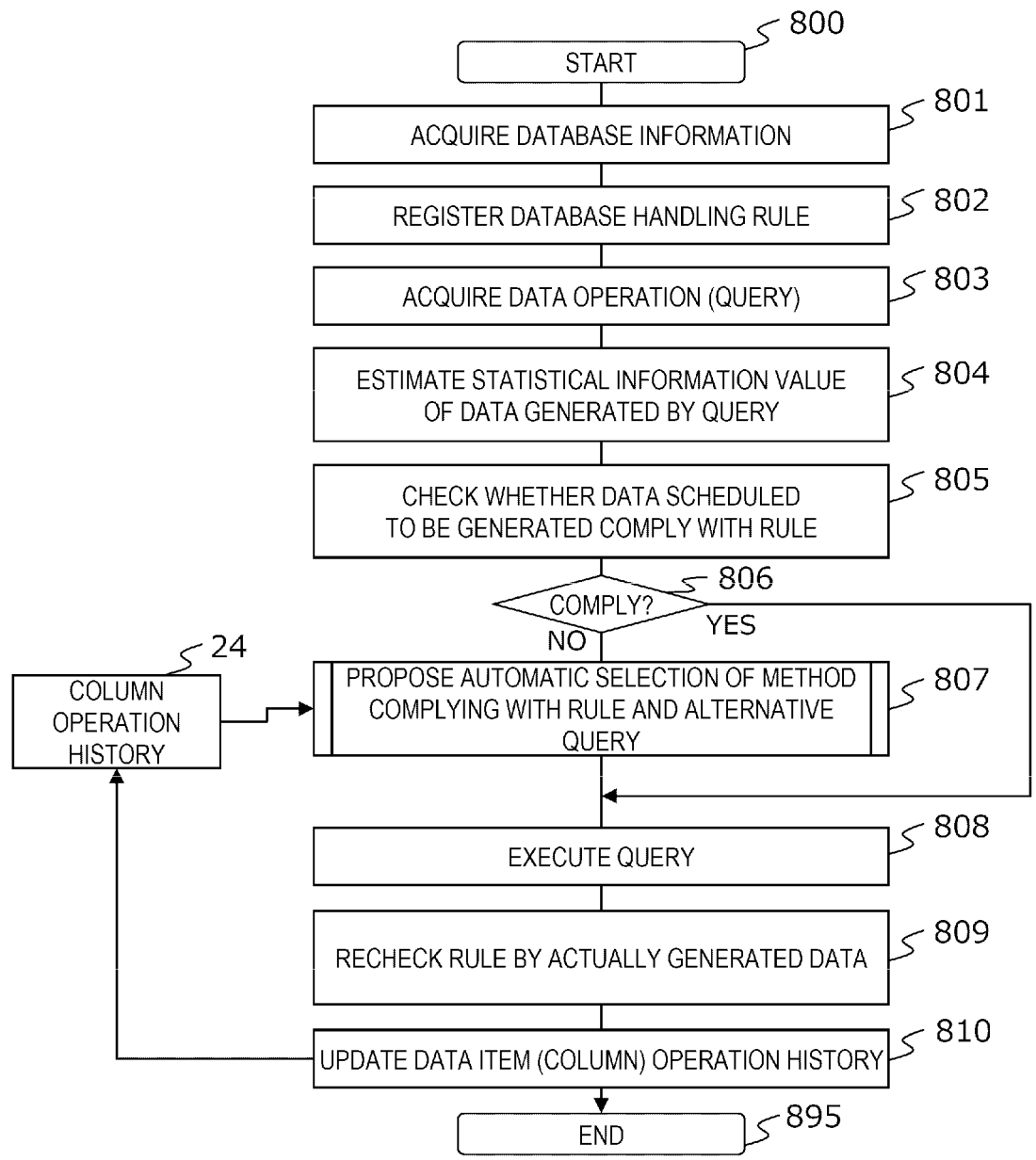

931 COLUMN OPERATION TABLE

| COLUMN INTERNAL ORDER | GENDER | ILLNESS | AGE | ... |
|---|---|---|---|---|
| 1 | EXTRACT ONLY FEMALE OR MALE | EXTRACT IN AXX-X FORMAT | ROUND-OFF BY INCREMENTS OF FIVE YEARS | ... |
| 2 | COLUMN DROP | EXTRACT IN AXX FORMAT | ROUND-OFF BY INCREMENTS OF TEN YEARS | ... |
| 3 | As is | ROUND-OFF IN ONLY A01-2 | As is | ... |
| 4 | <Null> | As is | ... | ... |
| ... | ... | ... | ... | ... |

932 OPERATION TRIAL LIST

| TRIAL ORDER | COLUMN OPERATION |
|---|---|
| 1 | GENDER: EXTRACT ONLY FEMALE OR MALE |
| 2 | AGE: ROUND-OFF BY INCREMENTS OF FIVE YEARS |
| 3 | ILLNESS: EXTRACT IN AXX-X FORMAT |
| 4 | ILLNESS: EXTRACT IN AXX FORMAT |
| 5 | GENDER: COLUMN DROP |
| ... | ... |

933 VIOLATION TARGET RULE

| ID | DB | DATA HANDLING REGULATION (RULE) |
|---|---|---|
| R11 | DB1 | PROHIBIT ACCESS TO DATA THAT DOES NOT SATISFY k VALUE ≥ 2 |

FIG. 10B

REFERENCE COLUMN: AGE, NUMBER OF TIMES OF REFERENCE (TOTAL): $XX_n$ TIMES

REFERENCE COLUMN: GENDER, NUMBER OF TIMES OF REFERENCE (TOTAL): $XX_s$ TIMES

COLUMN OPERATION: As is FOR AGE COLUMN, NUMBER OF TIMES OF OPERATION (TOTAL): $XX_{n1}$ TIMES

COLUMN OPERATION: ROUND-OFF BY INCREMENTS OF FIVE YEARS FOR AGE COLUMN, NUMBER OF TIMES OF OPERATION (TOTAL): $XX_{n2}$ TIMES

LARGE ←——— $w_j$ = WEIGHT OF COLUMN ———→ SMALL

| | GENDER | ILLNESS | AGE | ... |
|---|---|---|---|---|
| | EXTRACT ONLY FEMALE OR MALE $W_{11} = a_{11}$ | EXTRACT IN AXX-X FORMAT $W_{12} = a_{12}$ | ROUND-OFF BY INCREMENTS OF FIVE YEARS $W_{13} = a_{13}$ | ... |
| | COLUMN DROP $W_{21} = a_{21}$ | EXTRACT IN AXX FORMAT $W_{22} = a_{22}$ | ROUND-OFF BY INCREMENTS OF TEN YEARS $W_{23} = a_{23}$ | ... |
| | As is $W_{31} = a_{31}$ | ROUND-OFF IN ONLY A01-2 $W_{32} = a_{32}$ | As is $W_{33} = a_{33}$ | ... |
| | <Null> | As is $W_{42} = a_{42}$ | ... | ... |
| | ... | ... | ... | ... |

LARGE ↑ ... ↓ SMALL  $w_{ij}$ = WEIGHT OF OPERATION $$W_{ij} = w_j \times w_{ij}$$

FIG. 12B

```
COMMON ATTRIBUTES:
TARGET/KPI: REDUCE READMISSION RISK SCORE
PROJECT: K CITY SOCIAL INSURANCE EXPENSES REDUCTION
DATA USER: O1

REFERENCE COLUMN: AGE, REFERENCE DATE AND TIME:
    xx (MONTH) xx (DAY), xx (YEAR) TIME: XX:XX
                    ⋮
    REFERENCE COLUMN: GENDER, REFERENCE DATE AND TIME:
    yy (MONTH) yy (DAY), yy (YEAR) TIME: YY:YY

REFERENCE COLUMN: ILLNESS, REFERENCE DATE AND TIME:
    zz (MONTH) zz (DAY), zz (YEAR) TIME: ZZ:ZZ
                    ⋮
    ─────────────────────────────────────────────
    REFERENCE COLUMN: AGE, NUMBER OF TIMES OF REFERENCE (TOTAL):
    XX TIMES
    REFERENCE COLUMN: GENDER, NUMBER OF TIMES OF REFERENCE (TOTAL):
    YY TIMES
    REFERENCE COLUMN: ILLNESS, NUMBER OF TIMES OF REFERENCE (TOTAL):
    ZZ TIMES
                    ⋮
```
⟵ IG1

```
COMMON ATTRIBUTES:
TARGET/KPI: BUILD HIGH-PRECISION NURSING CARE LEVEL PREDICTION AI MODEL
PROJECT: H PREFECTURE HEALTHY LIFE IMPROVEMENT
DATA USER: O2

REFERENCE COLUMN: AGE, REFERENCE DATE AND TIME:
    xx (MONTH) xx (DAY), xx (YEAR) TIME: XX:XX
                    ⋮
    REFERENCE COLUMN: GENDER, REFERENCE DATE AND TIME:
    yy (MONTH) yy (DAY), yy (YEAR) TIME: YY:YY

REFERENCE COLUMN: ILLNESS, REFERENCE DATE AND TIME:
    zz (MONTH) zz (DAY), zz (YEAR) TIME: ZZ:ZZ
                    ⋮
    ─────────────────────────────────────────────
    REFERENCE COLUMN: AGE, NUMBER OF TIMES OF REFERENCE (TOTAL):
    XX TIMES
    REFERENCE COLUMN: GENDER, NUMBER OF TIMES OF REFERENCE (TOTAL):
    YY TIMES
    REFERENCE COLUMN: ILLNESS, NUMBER OF TIMES OF REFERENCE (TOTAL):
    ZZ TIMES
                    ⋮
```
⟵ IG1

```
COMMON ATTRIBUTES
TARGET/KPI: REDUCE READMISSION RISK SCORE
PROJECT: K CITY SOCIAL INSURANCE EXPENSES
REDUCTION
DATA USER: O1
COLUMN OPERATION: As is FOR AGE COLUMN, OPERATION DATE AND TIME: xx (MONTH) xx (DAY), xx (YEAR)
TIME: XX:XX
    ⋮
COLUMN OPERATION: ROUND-OFF BY INCREMENTS OF FIVE YEARS FOR AGE COLUMN, OPERATION DATE
AND TIME: yy (MONTH) yy (DAY), yy (YEAR) TIME: YY:YY
    ⋮
COLUMN OPERATION: COLUMN DROP FOR GENDER COLUMN, OPERATION DATE AND TIME: xx (MONTH) xx
(DAY), xx (YEAR) TIME: XX:XX
    ⋮
─────────────────────────────────────────────
  COLUMN OPERATION: As is FOR AGE COLUMN, NUMBER OF TIMES OF OPERATION (TOTAL): XX TIMES

COLUMN OPERATION: ROUND-OFF BY INCREMENTS OF FIVE YEARS FOR AGE COLUMN,
  NUMBER OF TIMES OF OPERATION (TOTAL): YY TIMES
      ⋮
  COLUMN OPERATION: COLUMN DROP FOR GENDER COLUMN, NUMBER OF TIMES OF
  OPERATION (TOTAL): ZZ TIMES
      ⋮
```
⟵ IG2

```
COMMON ATTRIBUTES:
TARGET/KPI: BUILD HIGH-PRECISION NURSING CARE LEVEL PREDICTION AI
MODEL
PROJECT: H PREFECTURE HEALTHY LIFE IMPROVEMENT
DATA USER: O2
COLUMN OPERATION: As is FOR AGE COLUMN, OPERATION DATE AND TIME: xx (MONTH) xx (DAY), xx (YEAR)
TIME: XX:XX
    ⋮
COLUMN OPERATION: ROUND-OFF BY INCREMENTS OF FIVE YEARS FOR AGE COLUMN, OPERATION DATE
AND TIME: yy (MONTH) yy (DAY), yy (YEAR) TIME: YY:YY
    ⋮
COLUMN OPERATION: COLUMN DROP FOR GENDER COLUMN, OPERATION DATE AND TIME: xx (MONTH) xx
(DAY), xx (YEAR) TIME: XX:XX
    ⋮
─────────────────────────────────────────────
  COLUMN OPERATION: As is FOR AGE COLUMN, NUMBER OF TIMES OF OPERATION (TOTAL): XX TIMES

COLUMN OPERATION: ROUND-OFF BY INCREMENTS OF FIVE YEARS FOR AGE COLUMN,
  NUMBER OF TIMES OF OPERATION (TOTAL): YY TIMES
      ⋮
  COLUMN OPERATION: COLUMN DROP FOR GENDER COLUMN, NUMBER OF TIMES OF
  OPERATION (TOTAL): ZZ TIMES
      ⋮
```
⟵ IG2

⋮

DATA MANAGEMENT APPARATUS, DATA MANAGEMENT SYSTEM, AND DATA MANAGEMENT METHOD

CROSS-REFERENCE TO RELATED APPLICATION

The present application claims priority from Japanese application JP2022-111468, filed on Jul. 11, 2022, the content of which is hereby incorporated by reference into this application.

BACKGROUND OF THE INVENTION

1. Field of the Invention

The present invention relates to a data management apparatus, a data management system, and a data management method.

2. Description of Related Art

In recent years, in order to achieve a new society (society 5.0), free exchange of data including sensitive data (for example, sensitive personal information, etc.) is promoted among governments and people, thereby increasing circulation of the sensitive data among the governments and people. In addition, use of the sensitive data is promoted in medical fields such as aggravation prevention programs.

Various rules that define handling of data in a database are present for each region and organization in order to use the sensitive data and the like. For example, there is a rule for enhancing anonymity of the data. Examples of the rule for enhancing the anonymity of the data include "prohibit collation with other information", "prohibit disclosure of data that can identify a specific individual, a medical institution, or the like in a case of a non-aggregated value", and "group people aged 90 or more into the same group when referring to personal age information".

PTL 1 discloses, as a related technique, acquiring, from a data user, information related to use conditions (for example, an anonymization method, importance, and the like of each attribute) of data to be used, creating a processing data candidate based on the acquired information, and providing a processing data group as a processing data providable group when a matching result of a plurality of processing data candidates among a processing data candidate group satisfies the use conditions.

CITATION LIST

Patent Literature

PTL 1: JP2021-197064A

SUMMARY OF THE INVENTION

When data scheduled to be generated by a data operation instruction (input query) to a database for a database management system for a certain purpose (for example, k-anonymization) violates a data handling rule, it is necessary for a data user to perform trial and error to avoid a problem. In particular, when rules related to a plurality of tables and a plurality of columns are violated, there is a variety of descriptions for operating the columns in order to satisfy an anonymization request for these rules, and it is necessary to avoid the rule violation by combining the descriptions.

Therefore, there is a problem that a work time and a man-hour (an amount of work required until the data user acquires target data) increase. In addition, even when the rule violation can be avoided, useful data may be missing or data may not be in line with a purpose of data utilization by the data user. This is because it is not possible to create an alternative for a useful (useful for the data user) data operation instruction (input query) that is in line with characteristics of the database and the purpose of data utilization by the data user and complies with the data handling rule.

The invention is made to solve the above problems. That is, an object of the invention is to provide a data management apparatus, a data management system, and a data management method capable of creating an alternative for a useful query when a query for operating a database violates a data handling regulation of the database.

In order to achieve the above problems, a data management apparatus according to the invention is a data management apparatus including an information processing apparatus to which a query for operating a database is input and configured to generate data based on the database by using the query. The information processing apparatus is configured to generate, when the data generated based on the database by using the query violates a rule that is a data handling regulation of the database, an alternative query candidate that is a candidate of an alternative query to replace the query, determine whether the alternative query candidate violates the rule by determining whether data generated based on the database by using the alternative query candidate complies with the rule, and generate, when the alternative query candidate does not violate the rule, data based on the database by using the alternative query candidate as the alternative query.

A data management system according to the invention is a data management system that includes a data management apparatus including an information processing apparatus to which a query for operating a database is input from a client terminal and configured to generate data based on the database by using the query. The information processing apparatus is configured to generate, when the data generated based on the database by using the query violates a rule that is a data handling regulation of the database, an alternative query candidate that is a candidate of an alternative query to replace the query, determine whether the alternative query candidate violates the rule by determining whether data generated based on the database by using the alternative query candidate complies with the rule, and generate, when the alternative query candidate does not violate the rule, data based on the database by using the alternative query candidate as the alternative query.

A data management method according to the invention is a data management method using an information processing apparatus to which a query for operating a database is input and configured to generate data based on the database by using the query. The data management method including: by the information processing apparatus, generating, when the data generated based on the database by using the query violates a rule that is a data handling regulation of the database, an alternative query candidate that is a candidate of an alternative query to replace the query; determining whether the alternative query candidate violates the rule by determining whether data generated based on the database by using the alternative query candidate complies with the rule; and generating, when the alternative query candidate does not violate the rule, data based on the database by using the alternative query candidate as the alternative query.

According to the invention, when a query for operating a database violates a data handling regulation of the database, it is possible to create an alternative for a useful query.

BRIEF DESCRIPTION OF THE DRAWINGS

FIG. 3 is a diagram illustrating a rule management table;

FIG. 4 is a diagram illustrating a column operation history management table;

FIG. 5B is a diagram illustrating an equation used for calculation of entropy;

FIG. 7 is a diagram illustrating an operation trial list;

FIG. 8A is a flowchart illustrating a processing flow executed by an update proposing unit and a rule compliance checking unit;

FIG. 9C is a diagram illustrating an alternative query basis screen;

FIG. 10B is a diagram illustrating information;

FIG. 10C is a diagram illustrating information;

FIG. 10E is a diagram illustrating the weight calculation method;

FIG. 12B is a diagram illustrating information;

FIG. 12C is a diagram illustrating information;

DESCRIPTION OF EMBODIMENTS

Figure 1:
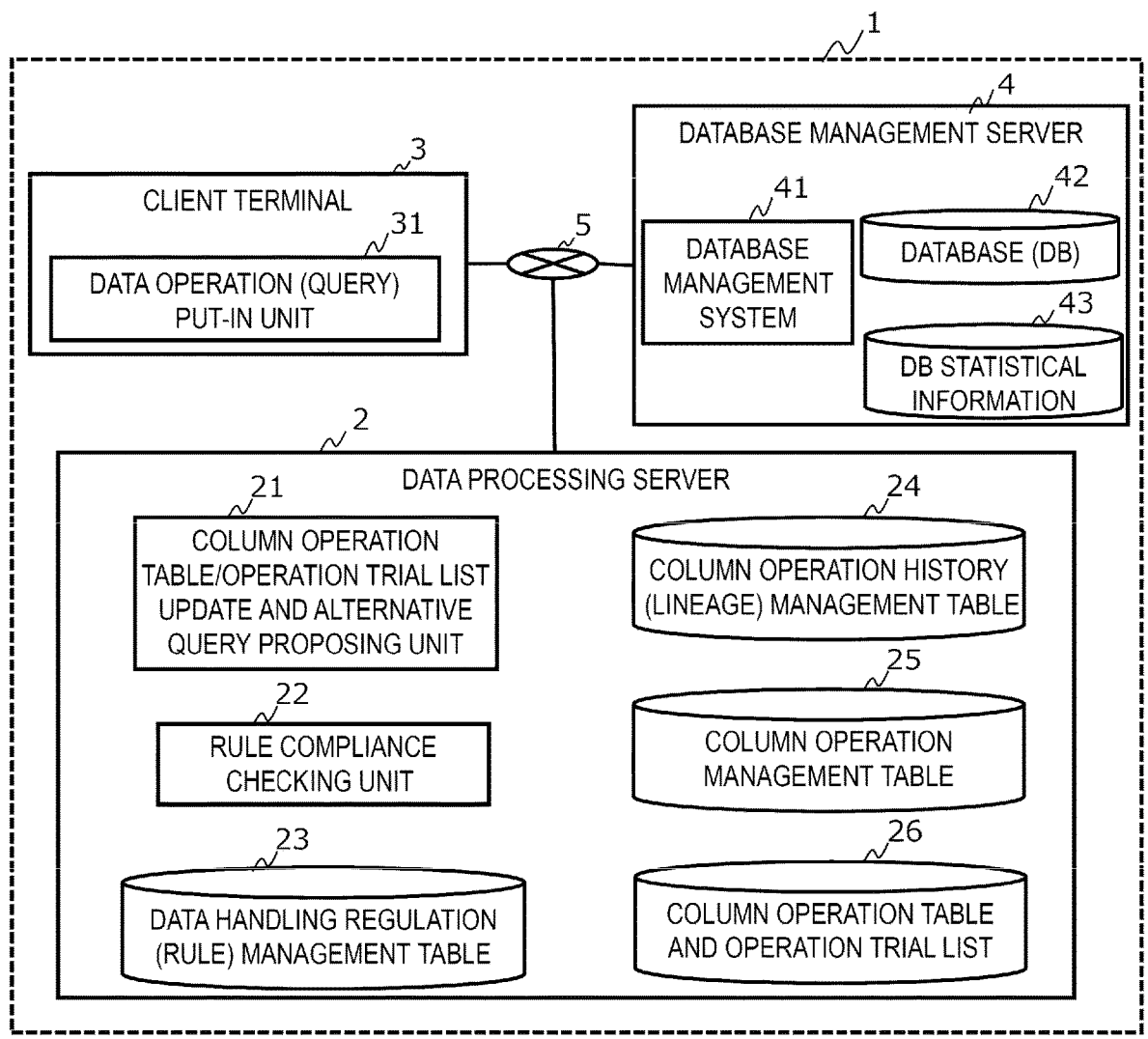
FIG. 1 is a schematic configuration diagram illustrating a configuration example of an information processing system including a data management apparatus (data processing server) according to a first embodiment of the invention.

Hereinafter, embodiments of the invention will be described with reference to the drawings. In all the drawings of the embodiments, the same or corresponding parts may be denoted by the same reference numerals.

In the present specification, a "data operation" refers to an instruction statement, such as "query", that performs data extraction, reference, search, and the like written in a database operation language such as "SQL". An instruction by a query may be referred to as a "data operation".

A "data item" generally refers to a "column" in a data table.

A "column operation" refers to processing performed on each column (data item). Examples of the "column operation" include "round-off by increments of five years" and "round-off by increments of ten years" for an age column, and "display in an AXX-X format" and "display in an AXX format" for an illness column (sometimes referred to as an "illness code column").

A "data handling regulation" is also referred to as a "rule", and refers to a regulation related to handling of data determined for each database.

A "history" is also referred to as "lineage", and refers to a history related to a data operation (recording of information related to a data operation).

"Attribute of data operation" refers to information related to a data user who creates a data operation (query) and information related to data utilization of a data user, such as a purpose of a data user, a project in which a data user is participating, and a data user (identification information of the data user).

"A query violates a rule" means that at least one of a result expected assuming that the query is executed and a result when the query is executed does not comply with a data handling rule of a database subjected to the query.

In a case of at least one of the following (1) and (2), it can be determined that a query violates a rule.

(1) Data scheduled to be generated from a database by a query does not comply with a data handling rule of the database.

(2) Data actually generated from a database by a query does not comply with a data handling rule of the database.

In the following description, various kinds of information may be described in terms of expressions such as "table" and "record", and the various kinds of information may be expressed by other data structures. When identification information is described, expressions such as "identification information" and "name" are used, and these expressions may be replaced with each other. In addition, in the following description, processing may be described by using a functional block as a subject, and the subject of the processing may be a processor, an information processing apparatus, or the like instead of the functional block.

First Embodiment

Configuration

FIG. 1 is a schematic configuration diagram illustrating a configuration example of an information processing system 1 including a data management apparatus according to a first embodiment of the invention.

As illustrated in FIG. 1, the information processing system 1 includes a data processing server 2, a client terminal 3, and a database management server 4. The above are connected so as to be able to communicate with each other (transmit and receive information) via a network 5. The information processing system 1 may also be referred to as a "data management system" for convenience. The data processing server 2 may also be referred to as a "data management apparatus". The data processing server 2 is a data management apparatus according to the first embodiment of the invention.

The data processing server 2 includes a "column operation table/operation trial list update and alternative query proposing unit 21" (hereinafter, referred to as an "update proposing unit 21"), a rule compliance checking unit 22, a data handling regulation (rule) management table 23 (hereinafter, referred to as a "rule management table 23"), a column operation history (lineage) management table 24 (hereinafter referred to as a "column operation history management table 24"), a column operation management table 25, and a column operation table and operation trial list 26.

The client terminal 3 includes a data operation (query) put-in unit 31 (hereinafter, referred to as a "query put-in unit 31").

The database management server 4 includes a database management system 41, a database 42, and DB statistical information 43.

Figure 2A:
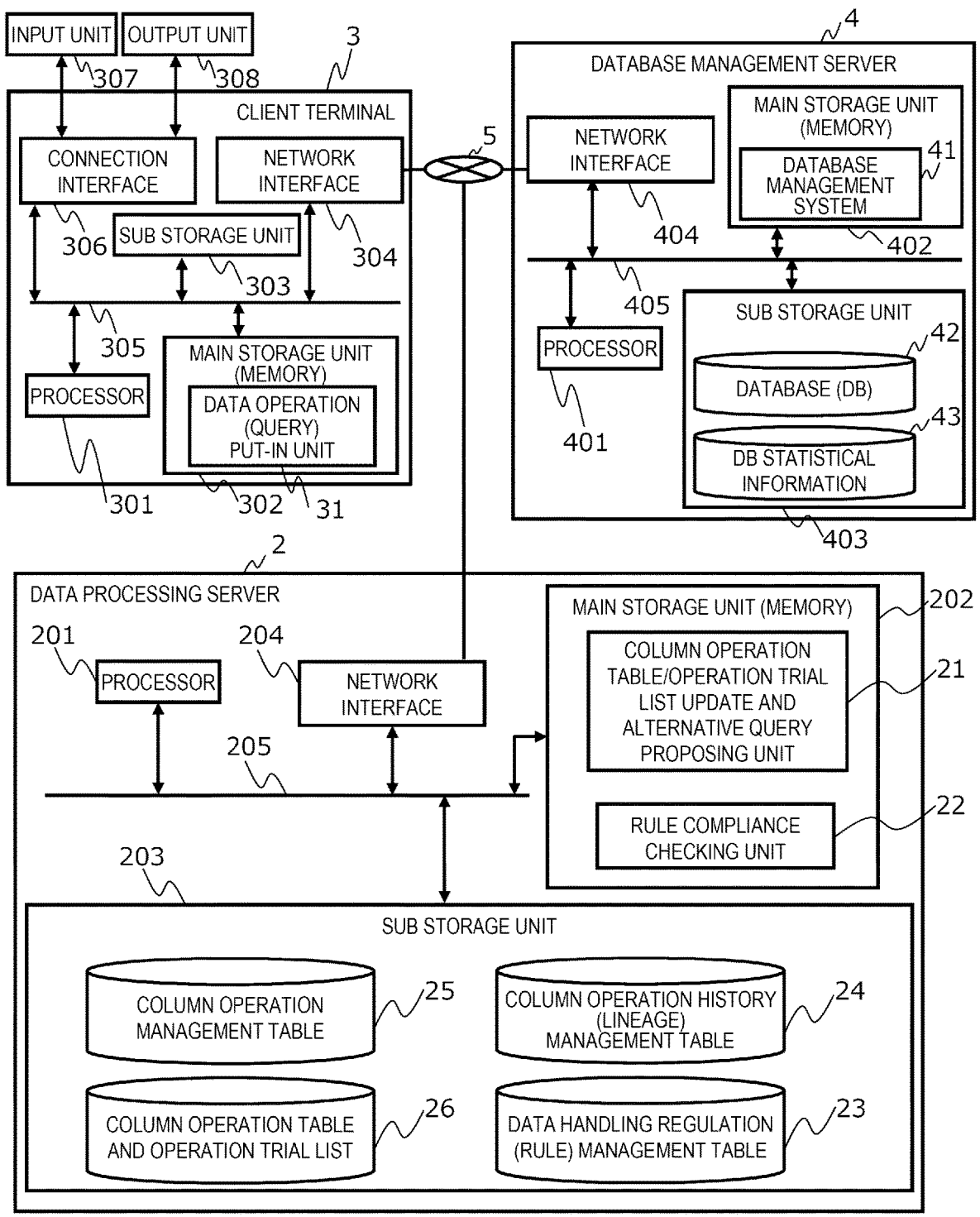
FIG. 2A is a schematic configuration diagram illustrating a hardware configuration example of a data processing server, a client terminal, and a database management server.

FIG. 2A is a schematic configuration diagram illustrating a hardware configuration example of the data processing server 2, the client terminal 3, and the database management server 4.

As illustrated in FIG. 2A, the data processing server 2 includes a processor 201, a main storage unit 202 (memory), a sub storage unit 203, a network interface 204, and a bus 205. An apparatus including the processor 201, the main storage unit 202, the sub storage unit 203, the network interface 204, and the bus 205 may also be referred to as an "information processing apparatus". The information processing apparatus may be a plurality of information processing apparatuses or a virtual information processing apparatus constructed on a cloud.

The main storage unit 202, the sub storage unit 203, and the network interface 204 are connected to the processor 201 via the bus 205.

The processor 201 loads programs (not illustrated) stored in the sub storage unit 203 into the main storage unit 202. The main storage unit 202 includes an update proposing unit 21 and a rule compliance checking unit 22 as the programs loaded by the processor 201. The processor 201 implements functions of the update proposing unit 21 and the rule compliance checking unit 22 by executing the programs loaded in the main storage unit 202.

In the main storage unit 202, as described above, the program executed by the processor 201 is loaded, and data used when the processor 201 executes the program is temporarily stored.

The sub storage unit 203 holds (stores) the programs, the rule management table 23, the column operation history management table 24, the column operation management table and the column operation table and trial list 26. The column operation table and trial list 26 includes a column operation table 26a and an operation trial list 26b.

The network interface 204 is an interface for connecting the data processing server 2 to the network 5.

The client terminal 3 includes a processor 301, a main storage unit 302 (memory), a sub storage unit 303, a network interface 304, a bus 305, and a connection interface 306.

The main storage unit 302, the sub storage unit 303, the network interface 304, and the connection interface 306 are connected to the processor 301 via the bus 305.

The processor 301 loads a program (not illustrated) stored in the sub storage unit 303 into the main storage unit 302. The main storage unit 302 includes a query put-in unit 31 as the program loaded by the processor 301. The processor 301 implements a function of the query put-in unit 31 by executing the program loaded in the main storage unit 302.

In the main storage unit 302, as described above, the program executed by the processor 301 is loaded, and data used when the processor 301 executes the program is temporarily stored.

The sub storage unit 303 holds (stores) the program.

The network interface 304 is an interface for connecting the client terminal 3 to the network 5.

The connection interface 306 is an interface for connecting an input unit 307 and an output unit 308. The input unit 307 is, for example, an operation unit such as a keyboard and a mouse, and the output unit 308 is, for example, a display unit or the like. An apparatus including the processor 301, the main storage unit 302, the sub storage unit 303, the network interface 304, the bus 305, the connection interface 306, the input unit 307, and the output unit 308 may also be referred to as a "terminal" or an "information processing terminal".

The database management server 4 includes a processor 401, a main storage unit 402 (memory), a sub storage unit 403, and a network interface 404. An apparatus including the processor 401, the main storage unit 402, the sub storage unit 403, and the network interface 404 may also be referred to as an "information processing apparatus". The information processing apparatus may be a plurality of information processing apparatuses or a virtual information processing apparatus constructed on a cloud.

The main storage unit 402, the sub storage unit 403, and the network interface 404 are connected to the processor 401 via a bus 405.

The processor 401 loads a program (not illustrated) stored in the sub storage unit 403 into the main storage unit 402. The main storage unit 402 includes the database management system 41 as the program loaded by the processor 401. The processor 401 implements a function of the database management system 41 by executing the program loaded in the main storage unit 402.

In the main storage unit 402, as described above, the program executed by the processor 401 is loaded, and data used when the processor 401 executes the program is temporarily stored.

Figure 2B:
FIG. 2B is a diagram illustrating an example of a database.

The sub storage unit 403 holds (stores) the program, the database 42, and the DB statistical information 43. The database 42 includes a database (DB). An example of the database 42 includes a database DB1 (table) in a table form illustrated in FIG. 2B. As illustrated in FIG. 2B, the database DB1 includes, for example, an age column, a gender column, and an illness column (illness code column) as columns for storing information (values). In the database DB1, information corresponding to each column is associated with each other and stored as information (record) in units of row. In the DB statistical information 43, statistical information of a database included in the database 42 is stored.

The network interface 404 is an interface for connecting the database management server 4 to the network 5.

FIG. 3 is a diagram illustrating the rule management table 23. The rule management table 23 is stored in the sub storage unit 203 of the data processing server 2. As illustrated in FIG. 3, the rule management table 23 includes an ID 23a, a database 23b, and a data handling regulation (rule) 23c (hereinafter, referred to as a "data handling regulation 23c") as columns for storing information (values).

In the rule management table 23, information corresponding to each column related to a data handling rule of the database is associated with each other and stored as information (record) in units of row.

Specifically, in the ID 23, identification information for identifying the data handling rule is stored. In the database 23b, identification information of the database to which the data handling rule is applied is stored. In the data handling regulation 23c, contents of the data handling rule are stored.

For example, contents described below are stored as the contents of the data handling rule.

Prohibit access to data that does not satisfy k value≥2.

The k value is a value indicating the number of pieces of data having the same attribute, the larger the value is, the more difficult it is to specify an individual or the like, and the smaller the value is, the easier it is to specify an individual or the like.

Group people aged 90 or more into the same group.

Prohibit access to data including an identifier of an individual.

FIG. 4 is a diagram illustrating the column operation history management table 24. The column operation history management table 24 is stored in the sub storage unit 203 of the data processing server 2. As illustrated in FIG. 4, the column operation history management table 24 includes a source 24a, a table 24b, a column 24c, a column operation 24d, a data user 24e, a project 24f, a purpose/KPI 24g, and a query execution time 24h as columns for storing information (values).

In the column operation history management table 24, information corresponding to each column related to a column operation history is associated with each other and stored as information (record) in units of row. The column operation history management table 24 may also be referred to as "history information related to execution of past queries" for convenience.

Specifically, in the source 24a, identification information of a database targeted for a column operation is stored. In the table 24b, a name of a table targeted for the column operation is stored. In the column 24c, a name of a column (data item) is stored. In the column operation 24d, contents of the column operation are stored. In the data user 24e, identification information for identifying a data user (user) is stored. In the project 24f, information indicating a project of a data operation is stored. In the purpose/KPI 24g, information indicating a purpose/KPI of the data operation (purpose of data user) is stored. In the query execution time 24h, an execution time (date and time) of the data operation is stored.

Figure 5A:
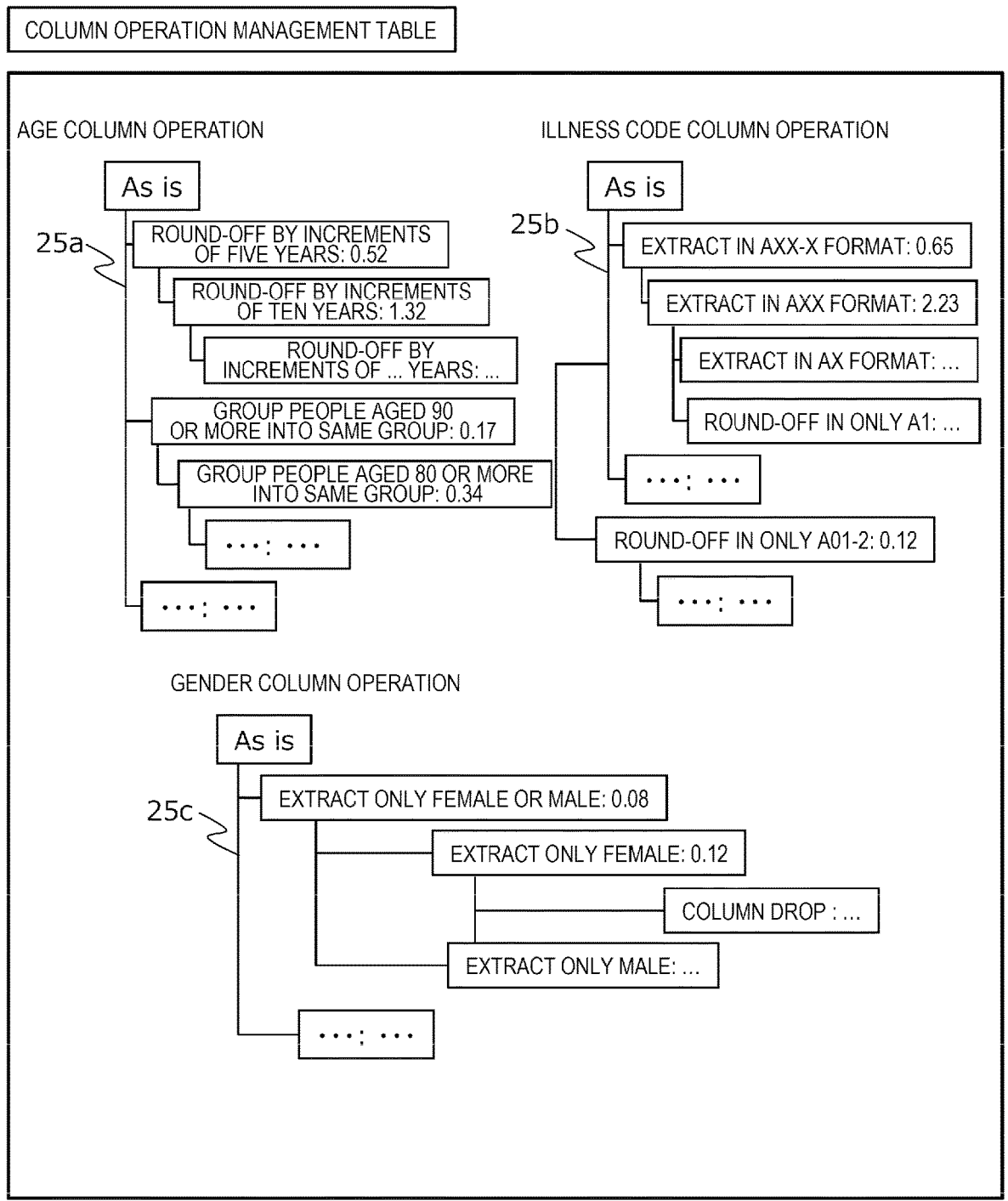
FIG. 5A is a diagram illustrating a column operation management table.

FIG. 5A is a diagram illustrating the column operation management table 25. The column operation management table 25 is held (stored) in the sub storage unit 203 of the data processing server 2. As illustrated in FIG. 5A, the column operation management table 25 includes an age column operation tree 25a, an illness code column operation tree 25b, and a gender column operation tree 25c. In the column operation management table 25, information (elements) corresponding to each tree related to the column operation is stored as information of a hierarchically associated tree structure. In the information of the tree structure, elements in a lower hierarchy (column operations) include elements in an upper hierarchy (column operations) in the same branch. Elements having no inclusion relationship (column operations) are divided into different branches. For example, "round-off by increments of ten years" as an age column operation includes "round-off by increments of five years" as an operation (rounding-off age information by increments of ten years includes an operation of rounding-off by increments of five years, and more information is scraped off). Therefore, "round-off by increments of ten years" as the age column operation is stored in the age column operation tree 25a so as to be lower in the hierarchy than "round-off by increments of five years" as the age column operation of the same branch. For example, an age column operation of grouping "people aged 90 or more into the same group" is performed for the same age, but is divided into another branch because there is no inclusion relationship with the age column operation "round-off by increments of XX years".

Specifically, in the age column operation tree 25a, for each column operation for the age column, "content of the column operation for the age column" and "a numerical value of entropy by the column operation" are stored as elements such that the smaller the numerical value of the entropy is, the higher the hierarchy is. The entropy is a parameter representing an information change amount per column by the column operation (amount of information lost due to column operation). The entropy indicates that the larger the value is, the larger the information change amount per column is. In other words, the larger the value of a reciprocal of the entropy is, the smaller the information change amount per column is. An entropy calculation method will be described later in detail with reference to FIG. 5B. In the age column operation tree 25a, elements having inclusion relationships are stored in the same branch, and elements having no inclusion relationship are stored in different branches.

In the age column operation tree 25a, with respect to the column operation (round-off in age), "round-off by increments of five years: 0.52", "round-off by increments of ten years: 1.32", and "round-off by increments of . . . years: . . . ) are stored as elements in an ascending order of the entropy from an upper hierarchy to a lower hierarchy.

In the age column operation tree 25a, with respect to the column operation (group people aged reference age or more in the same group), "group people aged 90 or more into the same group: 0.17", "group people aged 80 or more into the same group: 0.34", or the like are stored as elements in an ascending order of the entropy from an upper hierarchy to a lower hierarchy. In addition, for each column operation (not illustrated), the contents of the column operation and the numerical value of the entropy are stored as elements in the same structure.

In the illness code column operation tree 25b, with respect to the column operation (extract in XXX format), "extract in AXX-X format: 0.65", "extract in AXX format: 2.23", or the like are stored as elements in an ascending order of the entropy from an upper hierarchy to a lower hierarchy. In addition, for each column operation (not illustrated), the contents of the operation and the numerical value of the entropy are stored as elements in the same structure. In the illness code column operation tree 25b, elements having inclusion relationships are stored in the same branch, and elements having no inclusion relationship are stored in different branches.

In the gender column operation tree 25c, with respect to the column operation (extraction of gender), "extract only female or male: 0.08", "extract only female: 0.12", or the like are stored as elements in an ascending order of the entropy from an upper hierarchy to a lower hierarchy. In addition, for each column operation (not illustrated), the contents of the operation and the numerical value of the entropy are stored as elements in the same structure. In the gender column operation tree 25c, elements having inclusion relationships are stored in the same branch, and elements having no inclusion relationship are stored in different branches.

FIG. 5B is a diagram illustrating an equation used for calculation of the entropy. Entropy of one column operation D (element) stored in the column operation management table 25 can be calculated as follows. That is, the entropy of the column operation D applies Equation (1) and Equation (2) to a column before the column operation D is executed and a column after the column operation D is executed when the column operation D is executed (assumed to be executed) to the database included in the database 42 in the database management server 4. Accordingly, the entropy of one column operation D (element) is calculated. The calculation is performed on each of all elements (all column operations D) in advance, so that entropy of all the elements is calculated. The calculation of the entropy is an example. The calculation of the entropy may be executed by using the statistical information of the database. The calculation of the entropy may be executed at a timing at which the statistical information is updated and a timing at which a new record is inserted into the database, and a value of the entropy may be updated by a calculated value. As the value of the entropy, any value may be set by input of the data user.

Figure 6:
FIG. 6 is a diagram illustrating a column operation table.

FIG. 6 is a diagram illustrating the column operation table 26a included in the column operation table and operation trial list 26. The column operation table 26a is held (stored) in the sub storage unit 203 of the data processing server 2. As illustrated in FIG. 6, the column operation table 26a includes a column internal order 26a1, a gender 26a2, an illness 26a3, and an age 26a4 as columns for storing information (values). In the column internal order 26a1, a numerical value indicating an order is stored. In the gender 26a2, information (column operation contents) indicating the contents of the column operation for the gender column of the database DB1 is stored. In the illness 26a3, the contents of the column operation for the illness column (illness code column) of the database DB1 are stored. In the age 26a4, the contents of the column operation for the age column of the database DB1 are stored.

The column operation table 26a is created based on the column operation history management table 24 and the column operation management table 25. The gender 26a2, the illness 26a3, and the age 26a4 are arranged from the left in a descending order of the number of times of column operations for each of the gender 26a2, the illness 26a3, and the age 26a4. For example, when 120 queries are executed against the database DB1 in the past, 100 of which are column operations on the gender column, 80 of which are column operations on the illness column, and 50 of which are column operations on the age column, the columns are arranged from the left in an order of the gender 26a2, the illness 26a3, and the age 26a4 in a descending order of the number of times of reference.

According to the number of times of column operations for each of the gender column, the illness column, and the age column of the database DB1, the contents of the column operations are arranged from the top in a descending order of the number of times of reference. For example, among 100 times of the column operations for the gender column of the database DB1, when the extraction of only female and male is executed 80 times, column drop is executed 20 times, and As is (extraction of the information of the column stored in the table as it is) is executed 10 times, the extraction of only female and male, the column drop, and the As is are arranged in this order from the top. The contents of the column operations are also similarly arranged for the illness 26a3 and the age 26a4.

FIG. 7 is a diagram illustrating the operation trial list 26b included in the column operation table and operation trial list 26. The operation trial list 26b is held (stored) in the sub storage unit 203 of the data processing server 2. As illustrated in FIG. 7, the operation trial list 26b includes a trial order 26b1 and a column operation 26b2 as columns for storing information (values).

In the operation trial list 26b, information corresponding to each column related to the operation trial list 26b is associated with each other and stored as information (record) in units of row.

Specifically, in the trial order 26b1, a number indicating a trial order of a column operation is stored. In the column operation 26b2, contents of the column operation are stored.

The operation trial list 26b is created based on a weight $W_{ij}$ calculated for the column operation table 26a and each cell (element (column operation)) of the column operation table 26a. The creation of the operation trial list 26b and the calculation of the weight $W_{ij}$ will be described later in detail.

Outline of Operation

An outline of operation of the information processing system 1 will be described. The query put-in unit 31 of the client terminal 3 puts-in (inputs) a data operation (query) for operating the database 42 to the database management server 4 via the data processing server 2.

The query put-in unit 31 transmits, to the data processing server 2 via the network 5, a data operation (query) created by inputting information from the input unit 307 by the data user.

The data processing server 2 checks whether the data operation (query) complies with a data handling rule of the database 42 (rule violation).

For example, the data processing server 2 estimates a statistical information value (for example, k value or the like) of data scheduled to be generated (extracted and/or processed data) from the database 42 by the data operation (query) based on the DB statistical information 43. The data processing server 2 checks whether the data scheduled to be generated complies with the data handling rule of the database 42 based on the estimated statistical information value. When the data scheduled to be generated does not comply with the data handling rule of the database 42, the data processing server 2 automatically creates an alternative query complying with the rule, and proposes (transmits or outputs) the alternative query to the client terminal 3.

When the client terminal 3 instructs execution of the proposed alternative query, the data processing server 2 transmits (puts-in (inputs)) the alternative query to the database management server 4, and requests the database management server 4 to execute an operation according to the alternative query. The alternative query may be transmitted from the client terminal 3 to the database management server 4.

The database management server 4 generates data from the database 42 by the operation according to the alternative query, and transmits (outputs) the generated data to the client terminal 3. The client terminal 3 receives (acquires) the data transmitted from the database management server 4. The database management server 4 may transmit (output) the generated data to the data processing server 2. In this case, the data processing server 2 may transmit (output) the received data to the client terminal 3.

As will be described in detail later, as the alternative query, a query having a high possibility that the data scheduled to be generated by the alternative query complies with the data handling rule of the database and complies with a purpose (data utilization purpose) of a data user who created the data operation (query) is proposed based on the column operation history management table 24.

Accordingly, when the data generated by the data operation (query) does not comply with the data handling rule of the database, the data processing server 2 can automatically create an alternative query that complies with the data handling rule and is highly likely to be in line with the data utilization purpose of the data user based on past data operation histories (data operation performances) of the data user, and can propose the alternative query to the client terminal 3 (propose to the data user via the client terminal 3).

The above is the outline of the operation.

Specific Operation

Specific operation of the data processing server 2 will be described. FIG. 8A is a flowchart illustrating a processing flow executed by the update proposing unit 21 and the rule compliance checking unit 22. The rule compliance checking unit 22 starts processing from step 800, sequentially executes processing in steps 801 to 805 described below, and then proceeds to step 806.

Step 801: The rule compliance checking unit 22 acquires database information related to the database 42 from the database management server 4.

Step 802: The rule compliance checking unit 22 registers the data handling rule in the rule management table 23 based on the acquired database information.

Figure 8B:
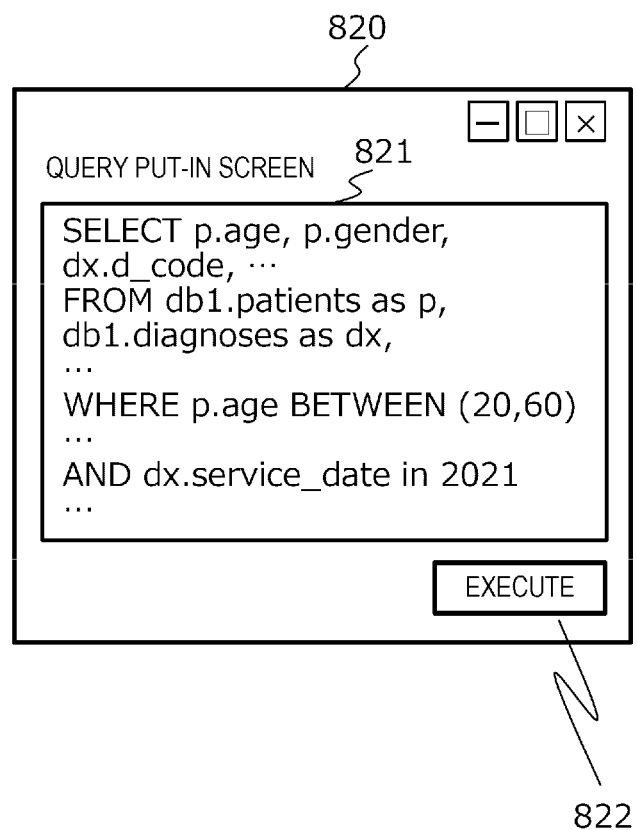
FIG. 8B is a diagram illustrating a query put-in screen.

Step 803: The rule compliance checking unit 22 acquires the data operation (query) from the client terminal 3. For example, the client terminal 3 displays a query put-in screen 820 illustrated in FIG. 8B that constitutes a graphical user interface (GUI). FIG. 8B is a diagram illustrating an example of a screen (image) displayed on a display unit (output unit 308) connected to the client terminal 3. As illustrated in FIG. 8B, the query put-in screen 820 includes a query input field 821 and an execution button 822. In the query input field 821, a query to be put-in is input and displayed. The execution button 822 is a button having an image. When the execution button 822 is operated, the query input to the query input field 821 is put-in (input) to the data processing server 2. The rule compliance checking unit 22 acquires the query put-in (input) from the client terminal 3.

Step 804: The rule compliance checking unit 22 estimates the statistical information value of the data scheduled to be generated by the data operation (query). The rule compliance checking unit 22 estimates the statistical information value of the data scheduled to be generated by referring to the DB statistical information 43 of the database management server 4. A specific example of the statistical information value estimated here includes, for example, the k value.

Step 805: The rule compliance checking unit 22 checks whether the data scheduled to be generated complies with the rule. For example, when the k value, which is the statistical information value of the data scheduled to be generated estimated in step 804, is 1, the data scheduled to be generated does not comply with the data handling rule of "prohibit access to data that does not satisfy k value≥2". In this case, the rule compliance checking unit 22 determines that the data scheduled to be generated does not comply with the rule. For example, when the k value, which is the statistical information value of the data scheduled to be generated, is 2 or more, the data scheduled to be generated complies with the data handling rule of "prohibit access to data that does not satisfy k value≥2". In this case, the rule compliance checking unit 22 determines that the data scheduled to be generated complies with the rule.

When the rule compliance checking unit 22 proceeds to step 806, the rule compliance checking unit 22 branches the processing according to a determination result in step 805. That is, when the determination result is that the data scheduled to be generated does not comply with the rule, the rule compliance checking unit 22 determines "NO" in step 806 and proceeds to step 807. The update proposing unit 21 sequentially executes processing in steps 807 and 808 described below, and then step 809 is executed for data actually generated by the rule compliance checking unit 22. After the update proposing unit 21 performs step 810, the processing flow proceeds to step 895 and temporarily ends.

Step 807: The update proposing unit 21 executes processing in FIG. 9A to propose automatic selection of a method (alternative query) complying with the rule and the alternative query to the client terminal 3. The processing in FIG. 9A will be described in detail later.

Step 808: The update proposing unit 21 executes the alternative query proposed to the client terminal 3 in step 807. Specifically, when the update proposing unit 21 receives, from the client terminal 3, a command of executing the alternative query proposed to the client terminal 3, the update proposing unit 21 executes the alternative query. That is, the update proposing unit 21 transmits (inputs) the alternative query to the database management server 4, and causes the database management server 4 to execute the alternative query. The data processing server 2 acquires data generated by the execution of the alternative query from the database management server 4.

Step 809: The rule compliance checking unit 22 refers to the rule management table 23 to recheck whether the data actually generated based on the database according to the alternative query in step 808 complies with the data handling rule. At this time, when the actually generated data does not comply with the data handling rule, the processing in step 807, step 808, and step 809 is executed again.

Step 810: The update proposing unit 21 updates the column operation history management table 24 based on the information related to the executed query (alternative query).

On the other hand, when the determination result in step 806 is that the data actually generated complies with the rule, the rule compliance checking unit 22 determines "YES" in step 806 and directly proceeds to step 808, and the update proposing unit 21 directly executes the data operation (query) acquired in step 803. Thereafter, the data processing server 2 executes the processing in step 809 and step 810 described above, and the processing flow proceeds to step 895 and temporarily ends.

Figure 9A:
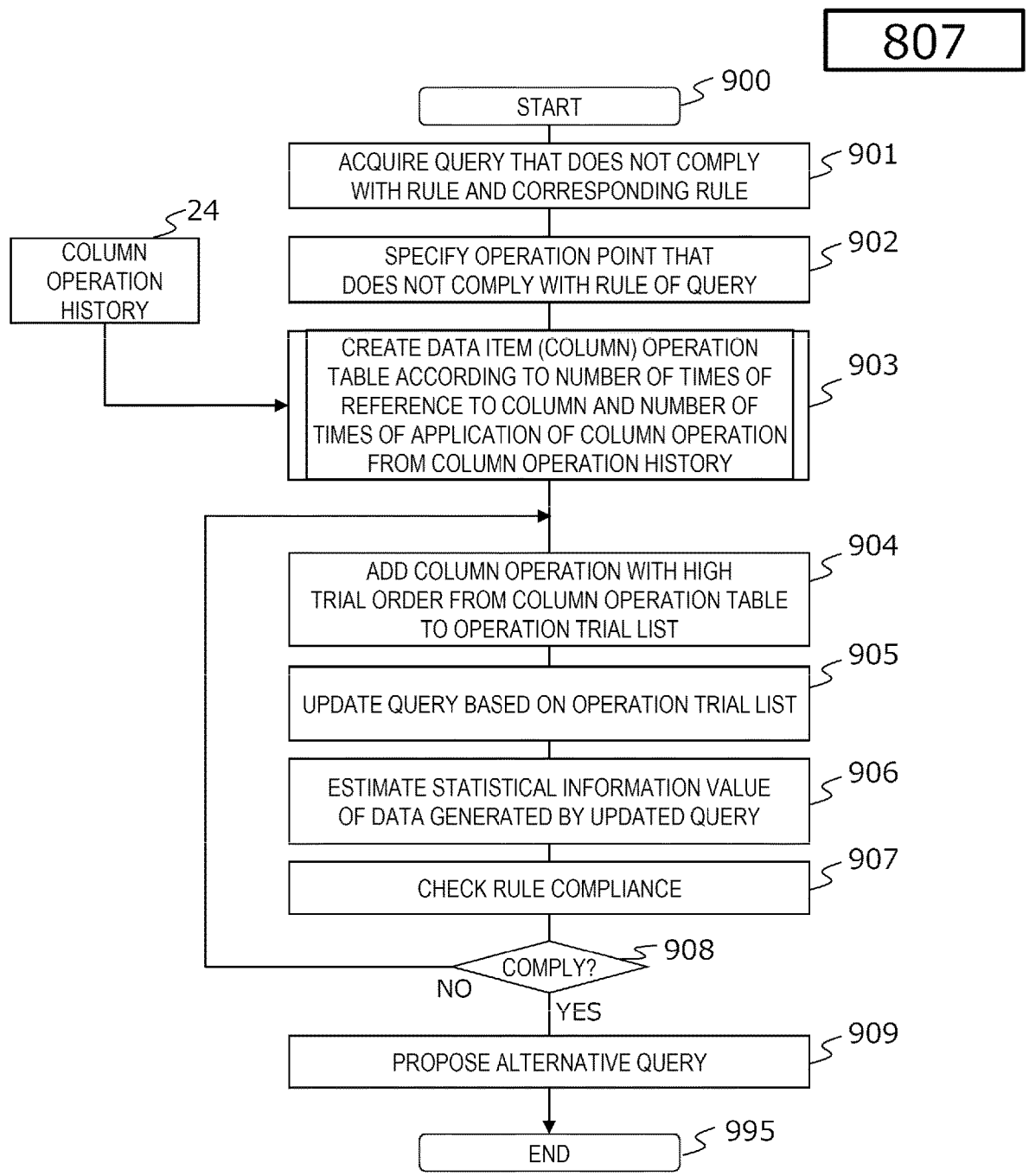
FIG. 9A is a flowchart illustrating a processing flow executed by the update proposing unit.

FIG. 9A is a flowchart illustrating a processing flow executed by the update proposing unit 21. When the processing flow proceeds to step 807 in FIG. 8A, the update proposing unit 21 starts the processing from step 900, sequentially executes processing in steps 901 to 907 described below, and then proceeds to step 908.

Step 901: The update proposing unit 21 acquires a query that does not comply with the data handling rule (query in which the data scheduled to be generated by the query does not comply with the data handling rule) and a corresponding rule (data handling rule that does not comply with the query).

Step 902: The update proposing unit 21 specifies an operation point that does not comply with the rule of the query. Specifically, the update proposing unit 21 acquires the rule management table 23, the information of the column, and parsed (syntax analyzed) token (word in the query). In addition, the update proposing unit 21 extracts a table and a column related to a violation rule from the rule management table 23 and the information of the column, and specifies operation description tokens in the table and the information of the column as the operation point that does not comply with the rule of the query.

Step 903: The update proposing unit 21 executes processing in FIG. 10A to create the column operation table 26a according to the number of times of reference to the column and the number of times of application of the column operation (the number of times of operation) based on the column operation history management table 24. The processing in FIG. 10A will be described in detail later.

Step 904: The update proposing unit 21 selects one column operation with a high trial order from the column operation table 26a, and adds the selected column operation in association with the trial order to the operation trial list 26b as information (record) in units of row. An initial operation trial list 26b is in a state where no record is present, and each time the step 904 is executed, information in units of row corresponding to the trial order and the selected column operation to be trialed is added to the operation trial list 26b. The trial order corresponds to an order of magnitudes of the weight $W_{ij}$ calculated for each column operation of the column operation table 26a described later (the same as the order of the magnitudes of the weight $W_{ij}$).

Step 905: The update proposing unit 21 updates the query based on the operation trial list 26b. Specifically, the update proposing unit 21 creates an updated query including a description (query) indicating the column operation added in step 904 by updating (editing (changing, adding, deleting, or the like)) the query that does not comply with the data handling rule acquired in step 901 (updated query when updated even once) so as to include the description (query) indicating the column operation added in step 904. The updated query may also be referred to as an "alternative query candidate" for convenience. The alternative query candidate can also be referred to as a query including a description of past queries with a relatively large number of operation performances.

Step 906: The update proposing unit 21 sends the updated query to the rule compliance checking unit 22 in order to check whether the updated query created in step 905 complies with the data handling rule. Based on the DB statistical information 43, the rule compliance checking unit 22 estimates the statistical information value of the data scheduled to be generated based on the database by the created updated query.

Step 907: The rule compliance checking unit 22 checks whether the data scheduled to be generated by the updated query complies with the data handling rule (that is, verifies whether the updated query violates the rule) by a method the same as the method described in step 805.

When the rule compliance checking unit 22 proceeds to step 908, the rule compliance checking unit 22 branches the processing according to a determination result in step 907. That is, when the determination result is that the data scheduled to be generated by the updated query does not comply with the rule, the rule compliance checking unit 22 determines "NO" in step 908, returns to step 904, newly adds a column operation with a next highest trial order from the column operation table 26a to the operation trial list 26b based on the column operation table 26a, sequentially executes the processing in steps 905 to 907 described above, and then proceeds to step 908.

On the other hand, when the determination result is that the data scheduled to be generated by the updated query complies with the rule, the rule compliance checking unit 22 determines "YES" in step 908, sends the determination result to the update proposing unit 21, and proceeds to step 909.

When the processing flow proceeds to step 909, the update proposing unit 21 transmits (outputs) the updated query to the client terminal 3 as an alternative query, and proposes the alternative query to the client terminal 3 (proposes to the data user via the client terminal 3).

Figure 9B:
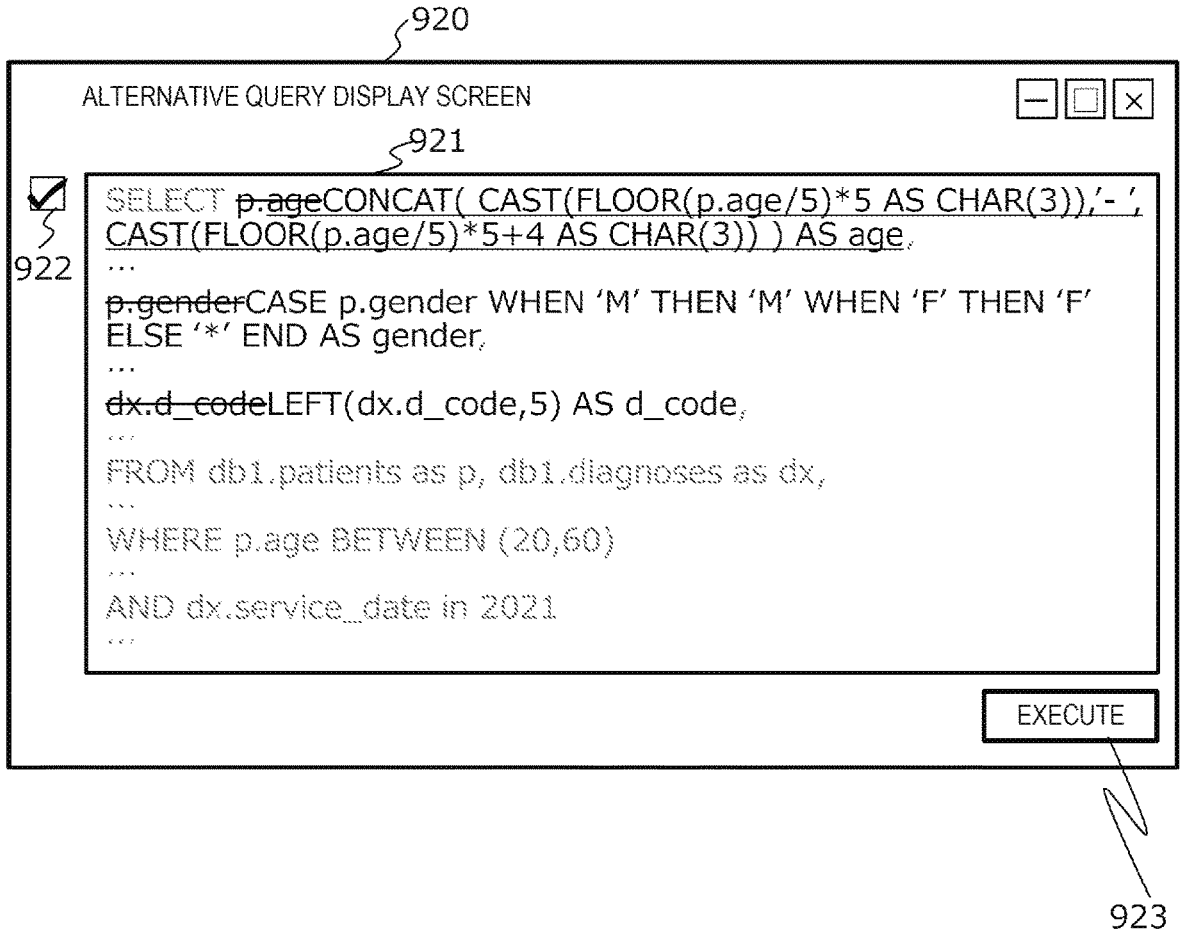
FIG. 9B is a diagram illustrating an alternative query display screen.

For example, the update proposing unit 21 proposes the alternative query to the data user by displaying an alternative query display screen 920 illustrated in FIG. 9B and including the alternative query on a display unit (for example, the display unit connected to the client terminal 3). FIG. 9B illustrates an example of the alternative query display screen. The alternative query display screen 920 includes an alternative query input field 921, a check box 922, and an execution button 923.

In the alternative query input field 921, the proposed alternative query is input and displayed. At this time, a changed point from an original query may be highlighted such that the changed point can be seen. For example, by drawing a strikethrough, an underline, or the like at the changed point, the changed point may be expressed in a mode in which the changed point is more easily visually recognized than other points (that is, highlighted). The check box 922 is displayed such that a check mark on the check box 922 is in a display state or a non-display state by operation.

The execution button 923 is a button having an image. When the execution button 923 is operated in a state where the check box 922 is checked (state where the check mark is displayed), the alternative query input to the alternative query input field 921 is put-in (input, transmitted) to the database management server 4.

The update proposing unit 21 may display an alternative query proposal basis screen 930 illustrated in FIG. 9C on a display unit (for example, the display unit connected to the client terminal 3). As illustrated in FIG. 9C, the alternative query proposal basis screen 930 includes a column operation table 931, an operation trial list 932, and a violation target rule 933. The column operation table 931 displays an image indicating the column operation table 26a created in step 903. The operation trial list 932 displays an image indicating the operation trial list 26b created at a time when the alternative query is proposed. The violation target rule 933 displays an image indicating the data handling rule to which the query acquired in step 901 does not comply with. The update proposing unit 21 can indicate a basis for proposal of the alternative query by displaying the alternative query proposal basis screen 930. Accordingly, the update proposing unit 21 can make the data user understand the operation of the system, and can assist the creation of the query at a next opportunity by the data user. The alternative query proposal basis screen 930 may be displayed alone, or may be displayed simultaneously with the alternative query display screen 920.

Thereafter, the update proposing unit 21 proceeds to step 995 to temporarily end the present processing flow. Thereafter, the processing returns to FIG. 8A, and proceeds to step 808 in FIG. 8A.

Figure 10A:
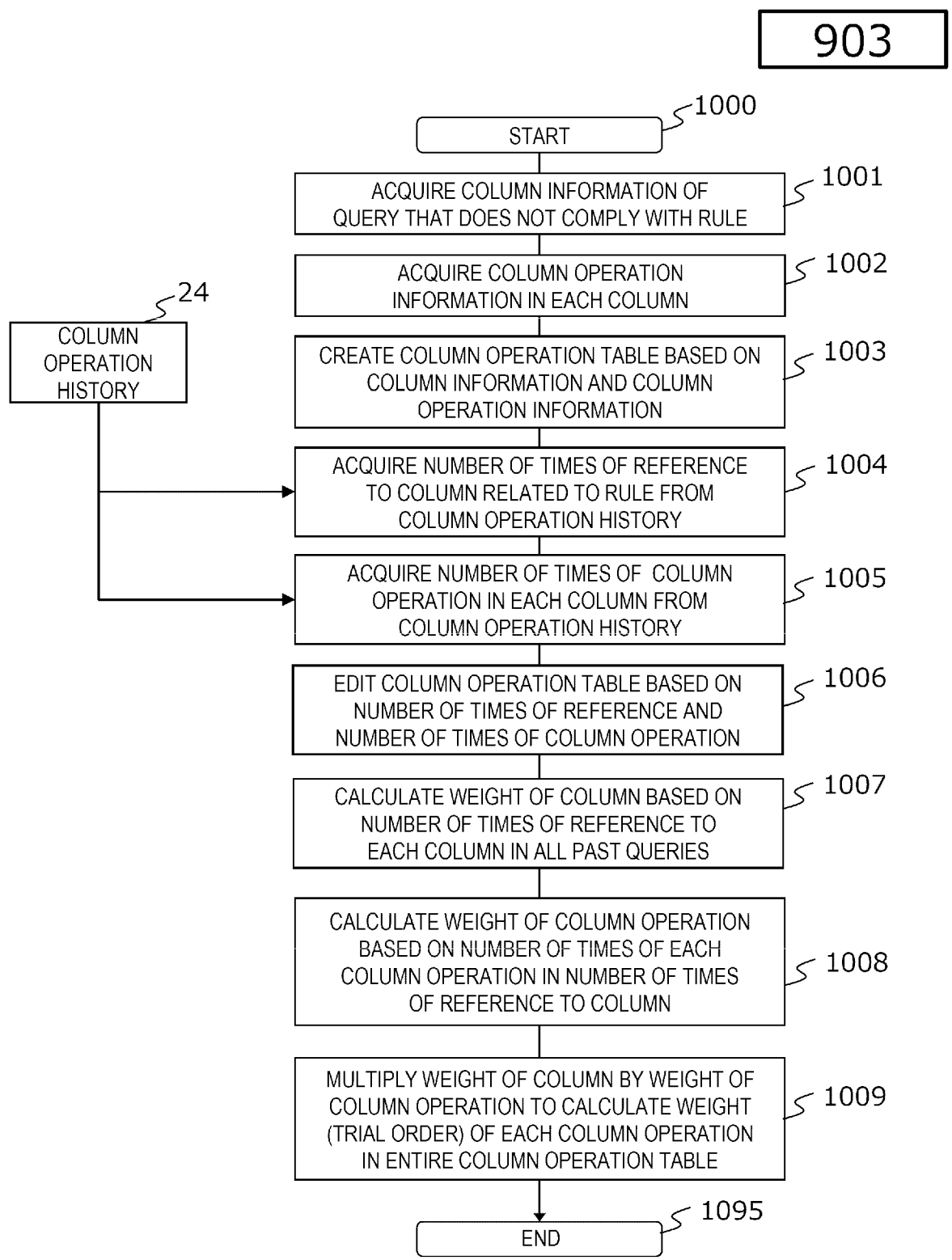
FIG. 10A is a flowchart illustrating a processing flow executed by the update proposing unit.

FIG. 10A is a flowchart illustrating a processing flow executed by the update proposing unit 21. When the update proposing unit 21 proceeds to step 903 in FIG. 9A, the update proposing unit 21 starts the processing from step 1000 in FIG. 10A, sequentially executes processing in steps 1001 to 1009 described below, and then proceeds to step

1095 to temporarily end the present processing flow. Thereafter, the update proposing unit 21 returns to step 904 in FIG. 9A.

Step 1001: The update proposing unit 21 acquires column information indicating a column (one or a plurality of columns) related to a query that does not comply with the rule.

Step 1002: The update proposing unit 21 acquires column operation information indicating a column operation content for each column related to the query that does not comply with the rule, based on the column operation management table 25.

Step 1003: The update proposing unit 21 creates the column operation table 26*a* from the column information and column operation information acquired in steps 1001 and 1002 based on past query execution history of the column operation history management table 24.

An example of the creation of the column operation table 26*a* will be described. For example, when the columns indicated by the column information are "age", "illness", and "gender", the update proposing unit 21 creates the column operation table 26*a* as follows.

That is, the update proposing unit 21 creates the "age 26*a*4", the "illness 26*a*3", and the "gender 26*a*2" as columns for storing information in the column operation table 26*a*.

The update proposing unit 21 stores each column operation of the age column operation tree 25*a* in each row of the age column with respect to the age 26*a*4 (age column) of the column operation table 26*a*.

The update proposing unit 21 stores each column operation of the illness code column operation tree 25*b* in each row of the illness column with respect to the illness 26*a*3 (illness column) of the column operation table 26*a*.

The update proposing unit 21 stores each column operation 25*c* of the gender column operation tree in each row of the gender column with respect to the gender 26*a*2 (gender column) of the column operation table 26*a*.

Step 1004: The update proposing unit 21 refers to the column operation history management table 24 to acquire the number of times of reference to the column related to the non-compliant rule. That is, the update proposing unit 21 refers to the column operation history management table 24 to acquire the number of times of reference (the total number of times of reference) to each column in the column operation table 26*a* created in step 1003. An example of acquired information (the number of times of reference to each column) is illustrated in FIG. 10B. In this example, $XX_n$, $XX_s$, . . . represent the number of times each column is referenced in the past queries.

Step 1005: The update proposing unit 21 refers to the column operation history management table 24 to acquire the number of times of column operation (the number of times of operation) in each column. That is, the update proposing unit 21 refers to the column operation history management table 24 to acquire the number of times of operation (the total number of times of operation) of the column operation for each column of the column operation table 26*a* created in step 1003. An example of acquired information (the number of times of operation of each column operation) is illustrated in FIG. 10C. In this example, $XX_{n1}$, $XX_{n2}$, . . . represent the number of times each column operation for the age column is executed in the past queries.

Step 1006: The update proposing unit 21 edits the column operation table 26*a* based on the number of times of reference to the column and the number of times of operation of the column operation. That is, as described above, the update proposing unit 21 edits the column operation table 26*a* such that the columns of the column operation table 26*a* are arranged from the left in a descending order of the number of times of reference, and the column operations (column operation contents) are arranged from the top in a descending order of the number of times of operation.

Step 1007: The update proposing unit 21 calculates a weight $w_j$ of the column based on the number of times of reference to each column in all the past queries (the number of times of reference acquired in step 1004) in the column operation table 26*a*. The weight $w_j$ of the column may be also referred to as a "first weight" for convenience.

Figure 10D:
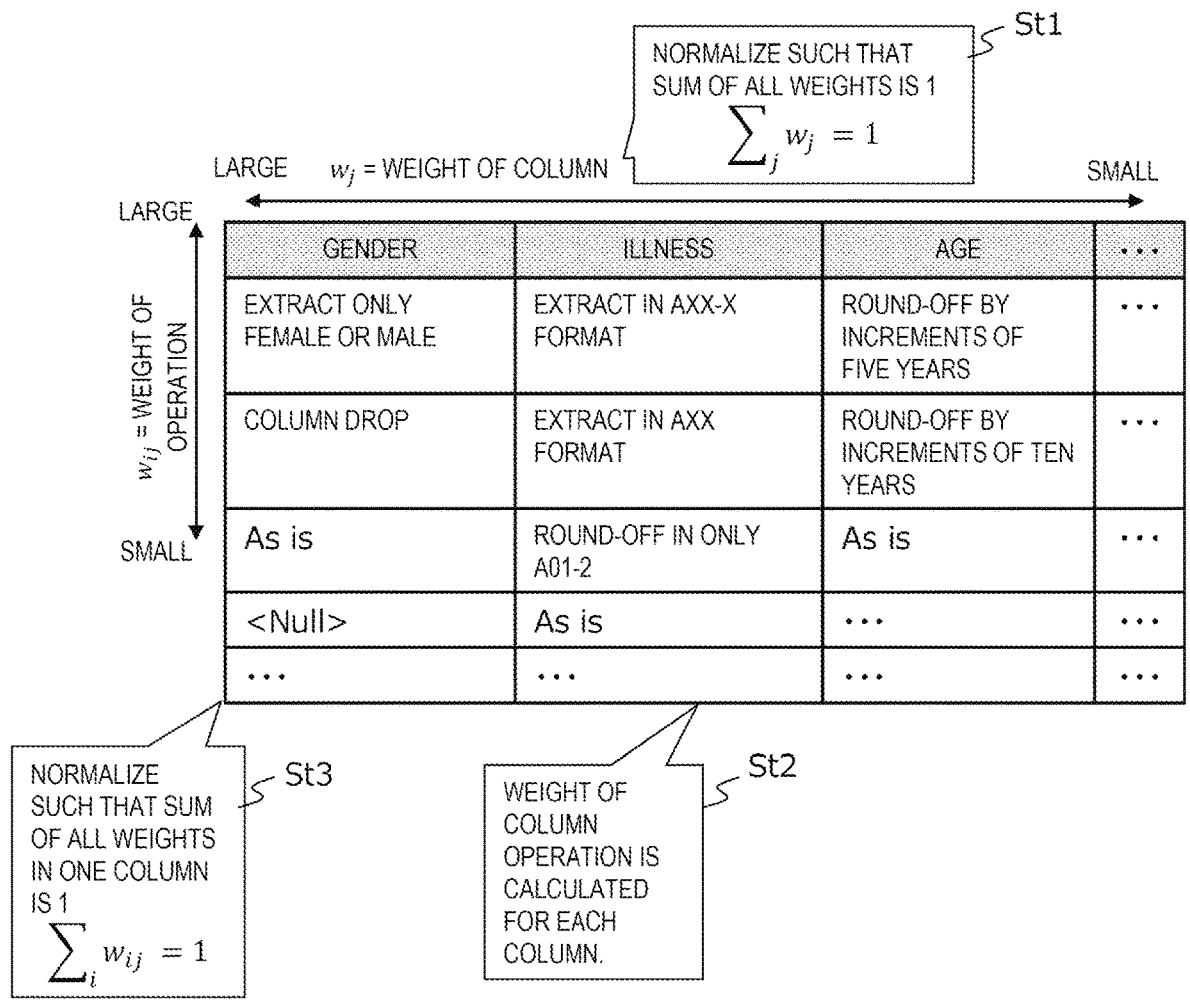
FIG. 10D is a diagram illustrating a weight calculation method.

For example, the weight $w_j$ of a certain column is calculated by dividing the number of times of reference to the certain column by a total number of times of reference to all the columns. Therefore, the weight $w_j$ of the column is normalized such that a sum of all the weights becomes "1" as indicated by an explanatory text St1 in FIG. 10D. "j" of the weight $w_j$ of the column indicates an integer n (n≥1) corresponding to an arrangement order of the columns from the left. Therefore, the weight $w_j$ of the column is a weight of a j-th column from the left after starting from a column adjacent to the column internal order 26*a*1 of the column operation table 26*a*. FIG. 10D illustrates the column operation table 26*a* in which the column internal order 26*a*1 is omitted.

Step 1008: The update proposing unit 21 calculates a weight $w_{ij}$ of the column operation based on the number of times of operation of each column operation. The weight $w_{ij}$ of the column operation may be also referred to as a "second weight" for convenience.

As indicated by an explanatory text St2 in FIG. 10D, the weight $w_{ij}$ (weight of the operation) of the column operation is calculated for each row of each column of the column operation table 26*a*. The weight $w_{ij}$ of a certain column operation is calculated by dividing the number of times of operation of the certain column operation by a total number of times of reference to all the column operations with respect to the same column as the column subjected to the column operation. Therefore, the weight $w_{ij}$ of the column operation is normalized such that a sum of all the weights $w_{ij}$ becomes "1" as indicated by an explanatory text St3 in FIG. 10D.

"j" of the weight $w_{ij}$ of the column operation is the same as described above, and "i" indicates an integer m (m≥1) corresponding to an arrangement order of the column from the top. Therefore, the weight $w_{ij}$ of the column operation is a weight of an i-th column operation from the top of a j-th column from the left.

Step 1009: The update proposing unit 21 multiplies the weight $w_j$ of the column calculated in step 1007 by the weight $w_{ij}$ of each column operation calculated in step 1008. Accordingly, the update proposing unit 21 calculates weights (trial order) of all column operations in the entire column operation table 26*a*. That is, as illustrated in FIG. 10E, the update proposing unit 21 calculates a weight $W_{ij}$ ($=w_j \times w_{ij}$) for each column operation (each cell (element)). "j" and "i" of the weight $W_{ij}$ represent the same as described above. Therefore, the Weight $W_{ij}$ is a weight of a j-th column operation (cell (element)) from the left and an i-th from the top of the column operation table 26*a*. An order of magnitudes of the weight $W_{ij}$ in the column operation table 26*a* is adopted as the trial order of the column operation in step 904 described above. Therefore, in step 904, the column operations of the column operation table 26*a* are added to the operation trial list 26*b* in a descending order of the weights $W_{ij}$, and trial is performed as a candidate for the alternative query (steps 905 to 908). In FIG. 10E, "$a_{ij}$" is a numerical value indicating a weight $W_{ij}$ obtained as a calculation result. For convenience of description, the numerical value indicating the weight $W_{ij}$ obtained as the calculation result is expressed by "$a_{ij}$". As an example of the calculation result of the weight $W_{ij}$, when a numerical relationship $a_{11}>a_{13}>a_{12}>a_{22}>a_{21}>\ldots$ is obtained, the operation trial list 26 has the trial order illustrated in FIG. 7.

As described above, as the number of times of reference to the column by past data operations and the number of times of operation of the column operation become relatively large, a trial order performed such that the column operation is included in the alternative query (that is, an order in which the rule conformance determination (step 907) is executed as the alternative query candidate) is in an earlier order. Therefore, an alternative query that is in line with past data utilization tendencies and does not violate the rule is more likely to be proposed more quickly.

Accordingly, when the query created by the data user is determined to violate the rule, the data processing server 2 can efficiently propose, to the data user via the client terminal 3, a query (alternative query) useful for the data user.

Effects

As described above, the data management apparatus according to the first embodiment of the invention can automatically create and propose an alternative of a useful query. Accordingly, the data management apparatus and a data user who uses the apparatus can reduce a work time and a man-hour. In addition, the data management apparatus can propose a rule violation point of a query in which a rule is violated along with the rule to the data user who created the query via the client terminal 3. The data management apparatus can more quickly (efficiently) propose an alternative query that is in line with the past data utilization tendencies and does not violate the rule, by calculating a trial order of column operations based on execution history of past queries.

Second Embodiment

A data management apparatus (data processing server 2) according to a second embodiment of the invention will be described. The data processing server 2 differs from the data processing server 2 according to the first embodiment only in the following point.

The data processing server 2 calculates the weight $w_j$ of a column and the weight $w_{ij}$ of a column operation of the column operation table 26a such that, the newer the data operation, the more important it is in each group having common attributes of the data operation (for example, a group in which a purpose of a data user who created the data operation (query), a project in which the data user participates, and the data user are all common). The calculation is based on the following idea.

Figure 11:
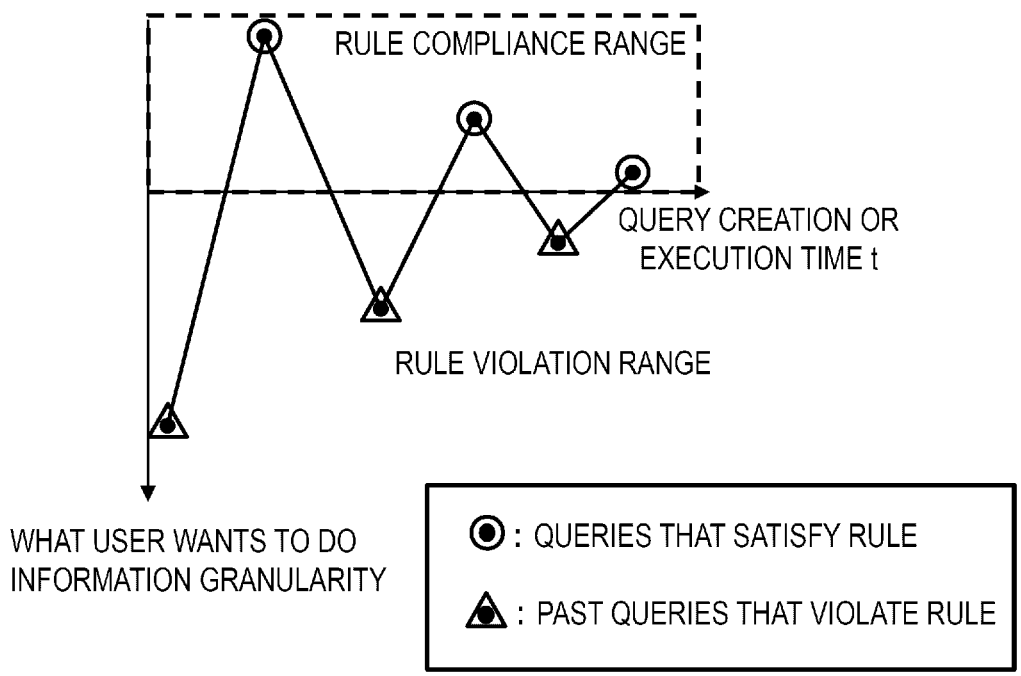
FIG. 11 is a diagram illustrating a concept of the weight calculation method.

It is preferable that the number of times of reference to a column and the number of times of operation of a column operation (both are once) are considered not to have the same data value in a case where a data value as a reference for determining a trial order of the column operation is considered. A reason for the above is that, for example, as illustrated in FIG. 11, as a data operation (query) in which a purpose of a data user who created the data operation (query), a project in which the data user participates, and the data user are all common, the later the query is created or executed in time (at a time close to a current time), the more often the rule is satisfied, and the more appropriate a data utilization purpose of the data user and information granularity of data generated by the query are likely to be.

Therefore, the data processing server 2 according to the second embodiment calculates the weight ($w_j$ and $w_{ij}$) as described above.

Specific Operation

Hereinafter, the above difference will be mainly described.

Figure 12A:
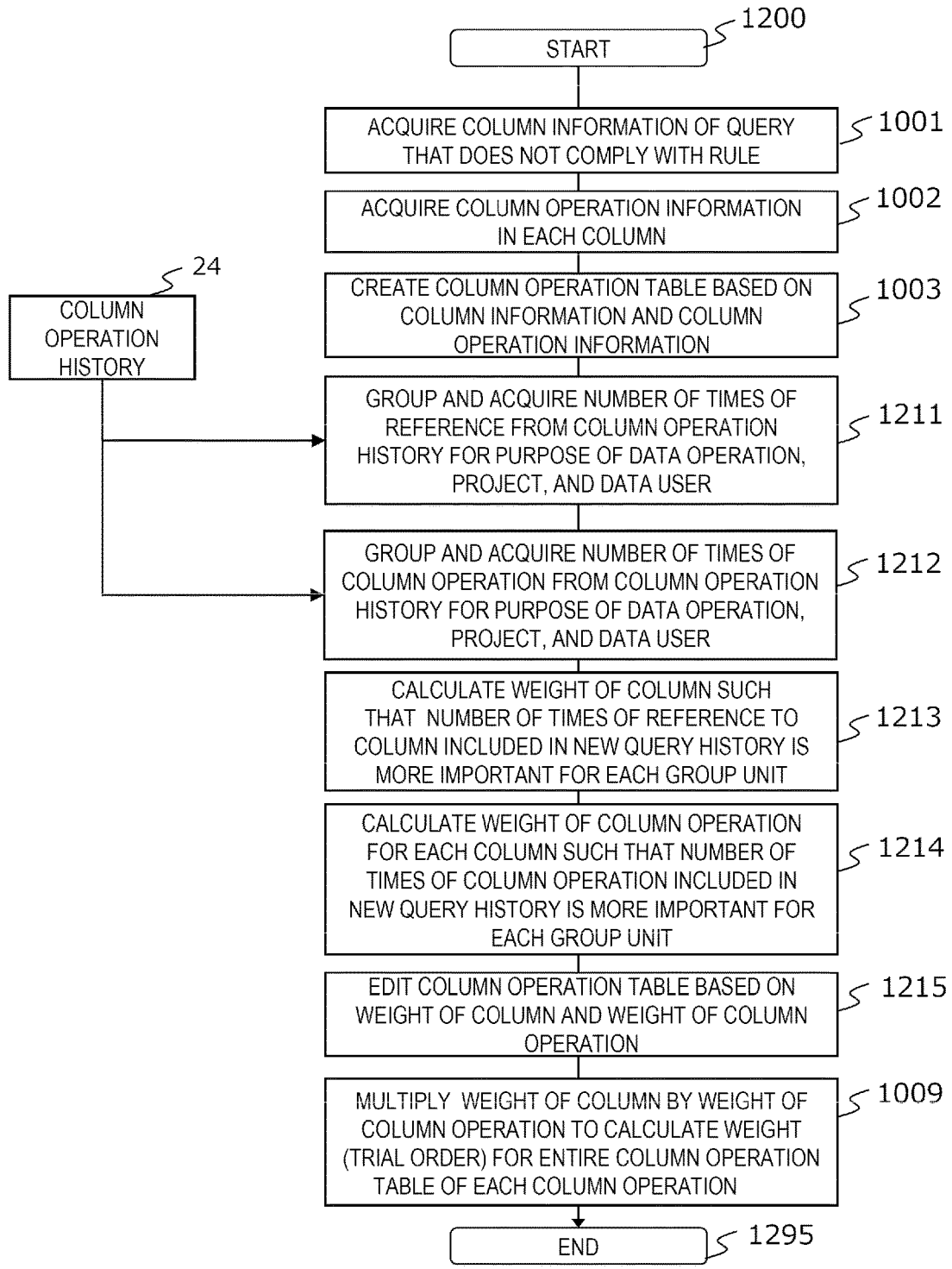
FIG. 12A is a flowchart illustrating a processing flow executed by the update proposing unit.

FIG. 12A is a flowchart illustrating a processing flow executed by the update proposing unit 21 of the data processing server 2 according to the second embodiment. The update proposing unit 21 executes the processing flow illustrated in the flowchart in FIG. 12A instead of the processing flow illustrated in the flowchart in FIG. 10A. Therefore, when the update proposing unit 21 proceeds to step 903 in FIG. 9A, the update proposing unit 21 starts the processing from step 1200 in FIG. 12A, sequentially executes processing in steps 1001 to 1003 described above, and then executes processing in step 1211 to step 1215 described below.

Step 1211: The update proposing unit 21 refers to the column operation history management table 24 to acquire a reference column, a reference time (reference date and time), and the number of times of reference for each column of the column operation table 26a for each group. Here, the group is a group in which all the attributes of the data operation are common (for example, a group in which the purpose of the data user who created the data operation, the project in which the data user participates, and the data user are all common). An example of information IG1 (information in a group unit) for each group to be acquired is illustrated in FIG. 12B. In FIG. 12B, for convenience of description, numerical values are expressed by xx, yy, zz, XX, YY, ZZ, and the like (the same applies to FIG. 12C).

Step 1212: The update proposing unit 21 refers to the column operation history management table 24 to acquire a column operation, an operation time (operation date and time), and the number of times of operation for each column operation of the column operation table 26a for each group. An example of information IG2 (information in a group unit) for each group to be acquired is illustrated in FIG. 12C.

Step 1213: The update proposing unit 21 calculates the weight $w_j$ of each column such that the number of times of reference to a column included in a new query history is more important for each group unit.

Specifically, first, the update proposing unit 21 calculates (corrects) a total number of times of reference to each column necessary for calculating the weight $w_j$ of each column as follows.

The update proposing unit 21 corrects the (total) number of times of reference to each column by calculating (recalculating) each piece of information IG1 in FIG. 12B based on the number of times of reference obtained by weighting the (total) number of times of reference to each column. That is, the update proposing unit 21 calculates the (total) number of times of reference to each column based on the number of times of reference (1×weight (times)) weighted by multiplying one time of reference of the column by the weight. The weight at this time is set, for example, based on the reference date and time of the column in the same group (for example, the weight is set to increase as the reference date and time of the column becomes slower in the same group).

Further, the update proposing unit 21 calculates the total number of times of reference to each column by adding up, for each column, the (total) number of times of reference to each column in a group unit calculated for each piece of information IG1. The update proposing unit 21 calculates the weight $w_j$ of each column by using the total number of times of reference to each column. That is, the update proposing unit 21 calculates the weight $w_j$ of each column by the same method as in the first embodiment.

Step 1214: The update proposing unit 21 calculates the weight $w_{ij}$ of each column operation such that the number of times of operation of the column operation included in the new query history is more important for each group unit.

Specifically, first, the update proposing unit 21 calculates (corrects) the total number of times of operation of each column operation necessary for calculating the weight $w_{ij}$ of each column operation as follows.

The update proposing unit 21 corrects the (total) number of times of operation of each column operation by calculating (re-calculating) each piece of information IG2 in FIG. 12C based on the number of times of operation obtained by weighting the (total) number of times of operation of each column operation. That is, the update proposing unit 21 calculates the (total) number of times of operation of each column operation based on the number of times of operation (1×weight (times)) weighted by multiplying one time of column operation by the weight. The weight at this time is set, for example, based on the operation date and time of the column operation in the same group (for example, the weight is set to increase as the operation date and time of the column operation becomes slower in the same group).

Further, the update proposing unit 21 calculates the total number of times of operation of each column operation by adding up, for each column operation, the (total) number of times of operation of each column operation in a group unit calculated for each piece of information IG2. The update proposing unit 21 calculates the weight $w_{ij}$ of each column operation by using the total number of times of operation of each column operation. That is, the update proposing unit 21 calculates the weight $w_{ij}$ of each column operation by the same method as in the first embodiment.

Step 1215: The update proposing unit 21 edits the column operation table 26a based on the calculated weight $w_j$ of each column and the weight $w_{ij}$ of each column operation. That is, the update proposing unit 21 edits the column operation table 26a such that the columns of the column operation table 26a are arranged from the left in a descending order of the weight $w_{ij}$ of the column, and the column operations are arranged from the top in a descending order of the weight $w_{ij}$ of the column operation.

Thereafter, the update proposing unit 21 proceeds to step 1009 and executes the processing in step 1009 described above to calculate the weight $W_{ij}$. The weight $W_{ij}$ is calculated in consideration of recency of the data operation in the group in which the purpose of the data user, the project, and the data user are all common. The weight $W_{ij}$ is calculated such that a new column operation is more important in a group unit in which the purpose of the data user, the project, and the data user are all common. Then, an order of magnitudes of the weight $W_{ij}$ in the column operation table 26a is adopted as the trial order of the column operation in step 904 described above. Therefore, when it is determined that the query created by the data user violates the rule, an alternative query that is in line with past data utilization tendencies, complies with the data utilization purpose of the data user, and does not violate the rule is more easily (more efficiently) proposed.

Thereafter, the update proposing unit 21 proceeds to step 1295 to temporarily end the present processing flow. Thereafter, the update proposing unit 21 returns to FIG. 9A, and proceeds to step 904 in FIG. 9A.

Effects

As described above, the data management apparatus according to the second embodiment of the invention calculates the weight $w_j$ of the column and the weight $w_{ij}$ of the column operation as described above in consideration of a difference in values of past query histories in time series. Accordingly, the data management apparatus can more efficiently propose a query that complies with the data utilization purpose of the data user and does not violate the rule as an alternative.

Third Embodiment

A data management apparatus (data processing server 2) according to a third embodiment of the invention will be described. The data processing server 2 differs from the data processing server 2 according to the first embodiment only in the following point.

The data processing server 2 calculates the weight $w_j$ of a column and the weight $w_{ij}$ of a column operation of the column operation table 26a using attributes (for example, purpose of data user, project, and data user) of a data operation. More specifically, the data processing server 2 differs from the data processing server 2 according to the first embodiment only in that, when calculating the weights ($w_j$ and $w_{ij}$) based on a column operation history, the weights are calculated such that a query (data operation) that is determined to violate a rule and is to be alternated with a higher similarity with respect to the attributes of the data operation (for example, purpose of data user, project, and data user) is more important.

The calculation is based on the following idea. As described above, it is preferable that the number of times of reference to a column and the number of times of operation of a column operation (both are once) are considered not to have the same data value in a case where a data value as a reference for determining a trial order of the column operation is considered. A reason for the above is that, a query whose purpose of a data user, project, and data user are highly relevant to the purpose of the data user, the project, and the data user of the query that violates the rule and is to be alternated often complies with a data utilization purpose of the data user.

Therefore, the data processing server 2 according to the third embodiment calculates the weights ($w_j$ and $w_{ij}$) as described above.

Specific Operation

Hereinafter, the difference will be mainly described.

Figure 13:
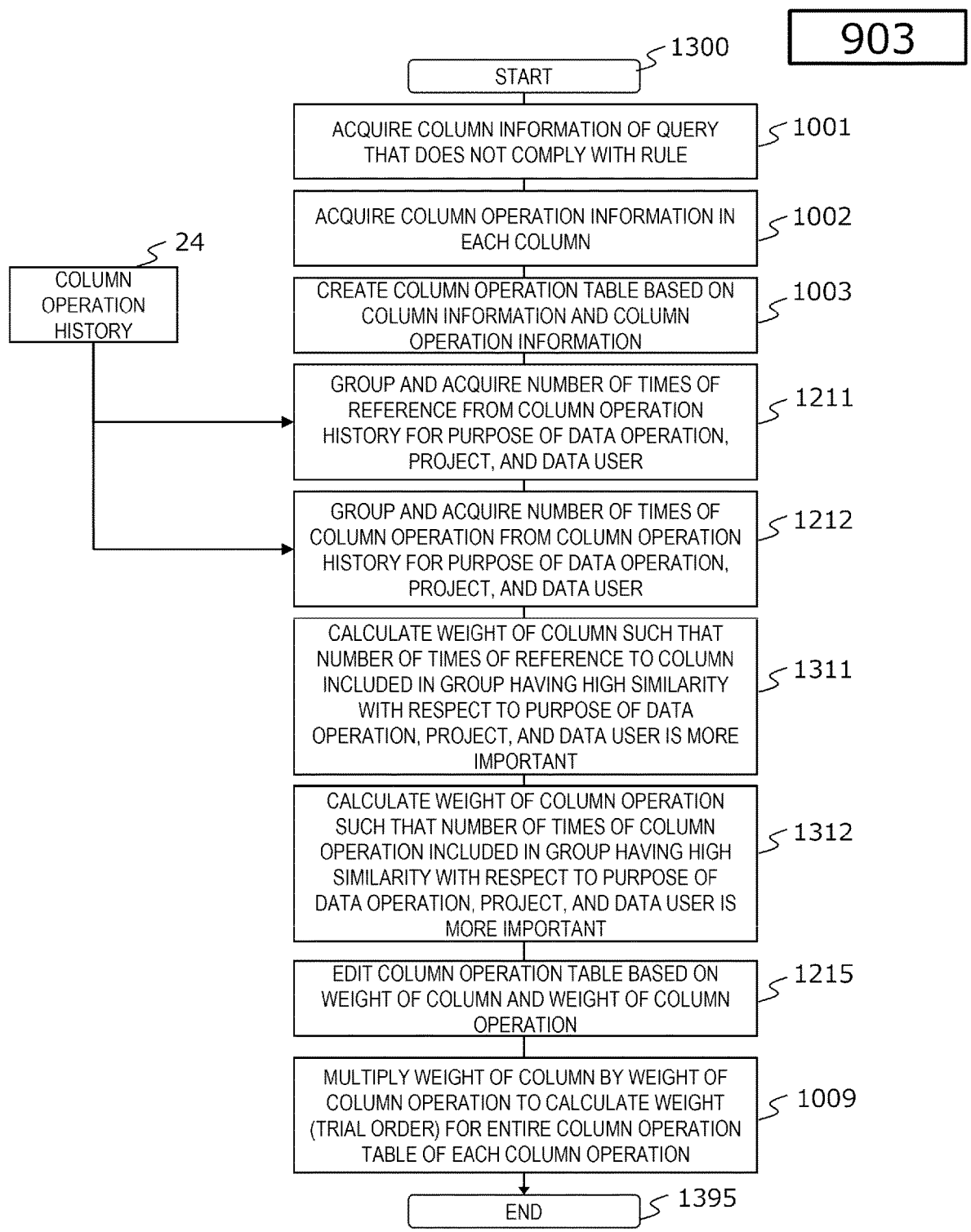
FIG. 13 is a flowchart illustrating a processing flow executed by the update proposing unit.

FIG. 13 is a flowchart illustrating a processing flow executed by the update proposing unit 21 of the data processing server 2 according to the third embodiment. The update proposing unit 21 executes the processing flow illustrated in the flowchart in FIG. 13 instead of the processing flow illustrated in the flowchart in FIG. 10A. Therefore, when the update proposing unit 21 proceeds to step 903 in FIG. 9A, the update proposing unit 21 starts processing from step 1300 in FIG. 13, and sequentially executes the processing in steps 1001 to 1003 described above and the processing in step 1211 and step 1212 described above. Thereafter, the update proposing unit 21 sequentially executes the processing in step 1311 and step 1312 described below, and the processing in step 1215 and step 1009 described above.

Step 1311: The update proposing unit 21 calculates the weight $w_j$ of a column such that the number of times of reference to the column included in the information IG1 (see FIG. 12B) of a group having a high similarity in attributes (purpose, project, and data user (identification information)) with a data operation (query) that does not comply with a rule is more important.

That is, the update proposing unit 21 acquires the attributes (purpose of data user, project, and data user (identification information)) of the data operation (query) that do not comply with the rule. In the following, for convenience, the attributes (purpose of data user, project, and data user (identification information)) of the data operation (query) that does not comply with the rule may also be referred to as "calculation reference attributes".

The update proposing unit 21 calculates, for each of the information IG1 collected in each group unit, a similarity of a group of the information IG1 with respect to the calculation reference attributes based on the attributes (calculation reference attributes) of the data operation (query) that does not comply with the rule and attributes of the group of the information IG1.

In this example, a similarity of the attributes (purpose of data user, project, and data user) of the group of the information IG1 with respect to the calculation reference attributes (purpose of data user, project, and data user) is calculated.

As an example of the calculation of the similarity, the similarity is calculated by referring to a similarity relationship management table (not illustrated). The similarity relationship management table includes a table of a tree structure for managing inclusion and correlation (similarity relationship) of a purpose/KPI, a table of a tree structure for managing inclusion and correlation (similarity relationship) of a project, and a table of a tree structure for managing inclusion and correlation (similarity relationship) of a data user.

The similarity of the group with respect to the calculation reference attributes of a certain piece of information IG1 is obtained as follows.

The update proposing unit 21 calculates a numerical value (hereinafter, referred to as a "first relational value") indicating a strength of a relationship between the purpose of the data user in the calculation reference attributes and the purpose of the data user in the attributes of the group of the information IG1, based on the table of the tree structure for managing the inclusion and correlation of the purpose/KPI. The first relational value is, for example, a continuous value from 0 to 1. The first relational value may be a discrete value from 0 to 1 (a second relational value and a third relational value described later are also the same).

For example, in the table of the tree structure, the first relational value is calculated such that the stronger the relationship between the purpose of the data user in the calculation reference attributes and the purpose of the data user in the attributes of the group of the information IG1 is, the larger the first relational value is. For example, when the purpose of data utilization in the attributes of the group of the information IG1 is the same as the purpose of the data user in the calculation reference attributes, a maximum value of "1" is calculated. On the other hand, in the tree structure, when the purpose of the data user in the attributes of the group of the information IG1 exists at a place that can only be reached by tracing back from the purpose of the data user in the calculation reference attributes to a root, a "minimum value" of "0" is calculated. Even when the purpose of the data user in the attributes of the group of the information IG1 exists at a place of a tree structure having a route different from the route of the tree structure to which the purpose of the data user in the calculation reference attributes belongs, the "minimum value" of "0" is calculated. In addition, a numerical value (a numerical value between 0 and 1 that increases as the relationship increases) according to the relationship between the purpose of the data user, which is an attribute of the group of the information IG1, and the purpose of the data user in the calculation reference attributes is calculated as the first relational value based on the tree structure.

In the same manner as described above, a numerical value (hereinafter, referred to as a "second relational value") indicating a strength of a relationship between the project in the calculation reference attributes and the project in the attributes of the group of the information IG1 is calculated based on the table of the tree structure for managing the inclusion and correlation of the project.

In the same manner as described above, a numerical value (hereinafter, referred to as a "third relational value") indicating a strength of a relationship between the data user in the calculation reference attributes and the data user in the attributes of the group of the information IG1 is calculated based on the table of the tree structure for managing the inclusion and correlation of the data user.

Then, a sum of the numerical values calculated above (sum of the first relational value, the second relational value, and the third relational value) is set as a similarity (distance) of the group of the certain piece of information IG1 with respect to the calculation reference attributes. A product of the numerical values calculated above (product of the first relational value, the second relational value, and the third relational value) may be set as the similarity (distance) of the group of the certain piece of information IG1 with respect to the calculation reference attributes.

Similarly, for other pieces of information IG1 other than the certain piece of information IG1, the similarity (distance) of the group is calculated.

The update proposing unit 21 calculates (corrects) the total number of times of reference to each column by summing up the number of times of reference to each column weighted such that the number of times of reference to the information IG1 of the group having a larger similarity (distance) is more important. The update proposing unit 21 calculates the weight $w_j$ of each column by the same method as in the first embodiment by using the total number of times of reference to each corrected column.

Step 1312: The update proposing unit 21 calculates, in the same manner as in step 1311, the weight $w_{ij}$ of each column operation such that the number of times of operation of a column operation having a high similarity is more important in a group unit. That is, the update proposing unit 21 calculates (corrects) the total number of times of operation of each column operation by summing up the number of times of operation of each column operation weighted such that the number of times of operation of the column operation in the information IG2 (see FIG. 12C) of the group having a larger similarity (distance) with respect to the attributes (calculation reference attributes) of the data operation (query) that does not comply with the rule is more important. The update proposing unit 21 calculates the weight $w_{ij}$ of each column operation by the same method as in the first embodiment by using the total number of times of operation of each column operation.

Thereafter, the update proposing unit 21 executes the processing in step 1215 described above, then proceeds to step 1009, and executes the processing in step 1009 described above to calculate the weight $W_{ij}$. The weight $W_{ij}$ is calculated such that the higher the similarity (relationship) with respect to the purpose of the data user who created the data operation (query), the project in which the data user participates, and the data user is, the more important the weight $W_{ij}$ is. Then, an order of magnitudes of the weight $W_{ij}$ in the column operation table 26a is adopted as the trial order of the column operation in step 904. Therefore, when it is determined that the query created by the data user violates the rule, an alternative query that is in line with past data utilization tendencies, complies with the data utilization purpose of the data user, and does not violate the rule is more easily (efficiently) proposed.

Thereafter, the update proposing unit 21 proceeds to step 1395 to temporarily end the present processing flow. Thereafter, the update proposing unit 21 returns to step 904 in FIG. 9A.

Effects

As described above, the data management apparatus according to the third embodiment of the invention calculates the weight $w_j$ of the column and the weight $w_{ij}$ of the column operation as described above in consideration of the similarity (distance) of the attributes of the data operation. Accordingly, the data management apparatus can more efficiently propose a query that complies with the data utilization purpose of the data user and does not violate the rule as an alternative.

Fourth Embodiment

A data management apparatus (data processing server 2) according to a fourth embodiment of the invention will be described. The data processing server 2 differs from the data processing server 2 according to the first embodiment only in the following point.

The data processing server 2 designates the weight $w_j$ of a column based on information input from the input unit 307 by a data user operating the input unit 307.

Specific Operation

Hereinafter, the difference will be mainly described.

Figure 14A:
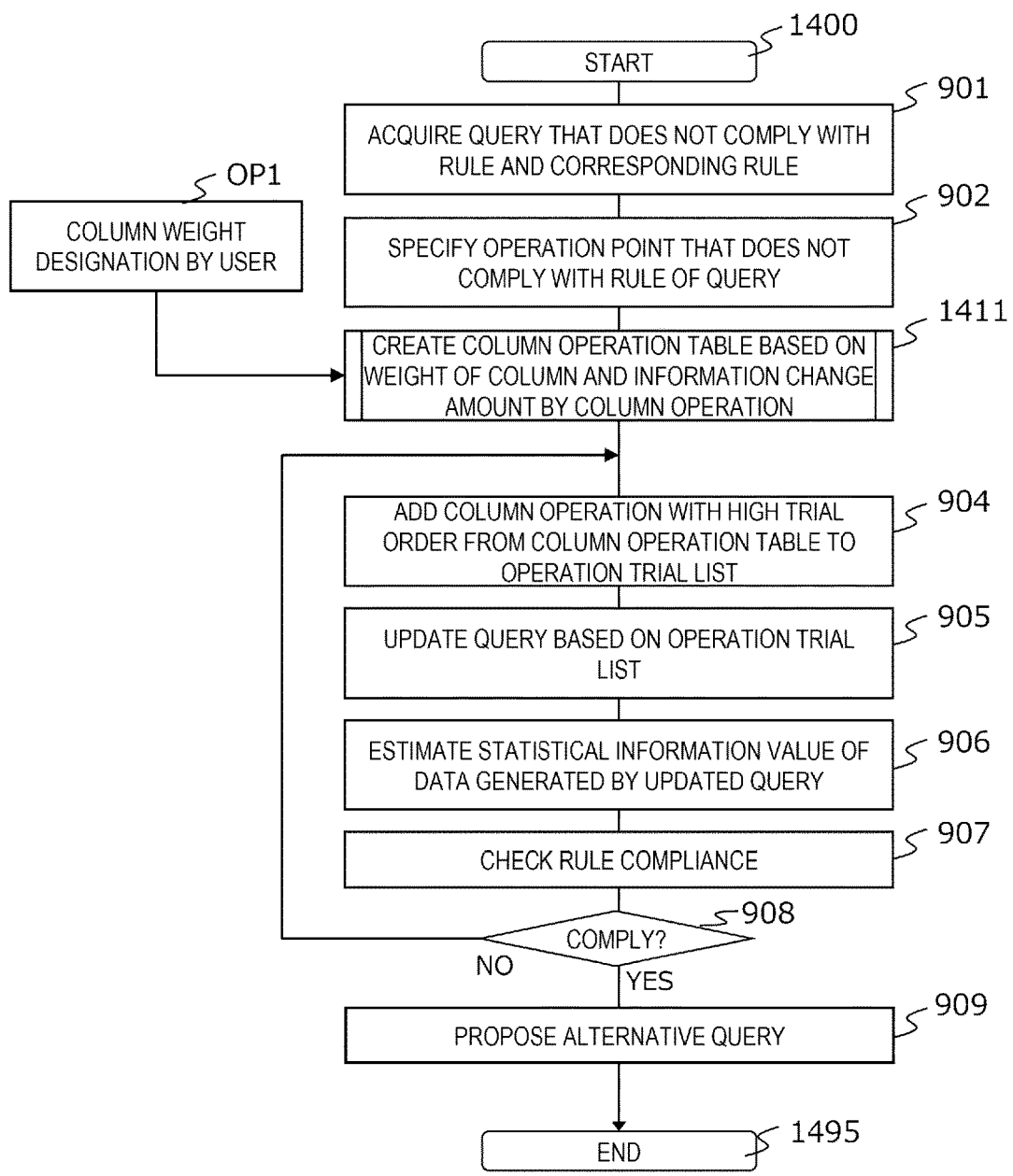
FIG. 14A is a flowchart illustrating a processing flow executed by the update proposing unit.

FIG. 14A is a flowchart illustrating a processing flow executed by the update proposing unit 21 of the data processing server 2 according to the fourth embodiment. The update proposing unit 21 executes the processing flow illustrated in the flowchart in FIG. 14A instead of the processing flow illustrated in the flowchart in FIG. 9A.

Therefore, when the update proposing unit 21 proceeds to step 807 in FIG. 8A, the update proposing unit 21 starts processing from step 1400 in FIG. 14A, sequentially executes the processing in step 901 and step 902 described above, and then proceeds to step 1411.

Figure 14B:
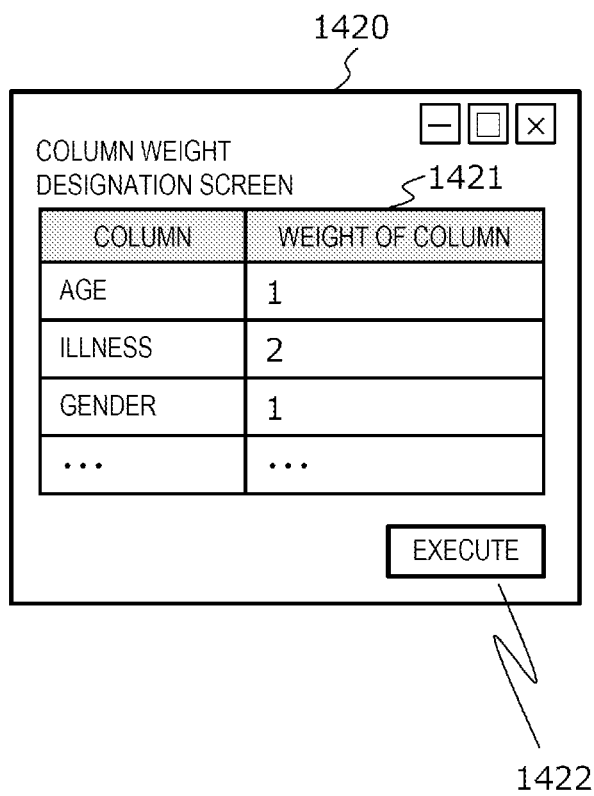
FIG. 14B is a diagram illustrating a weight designation screen.
Figure 15:
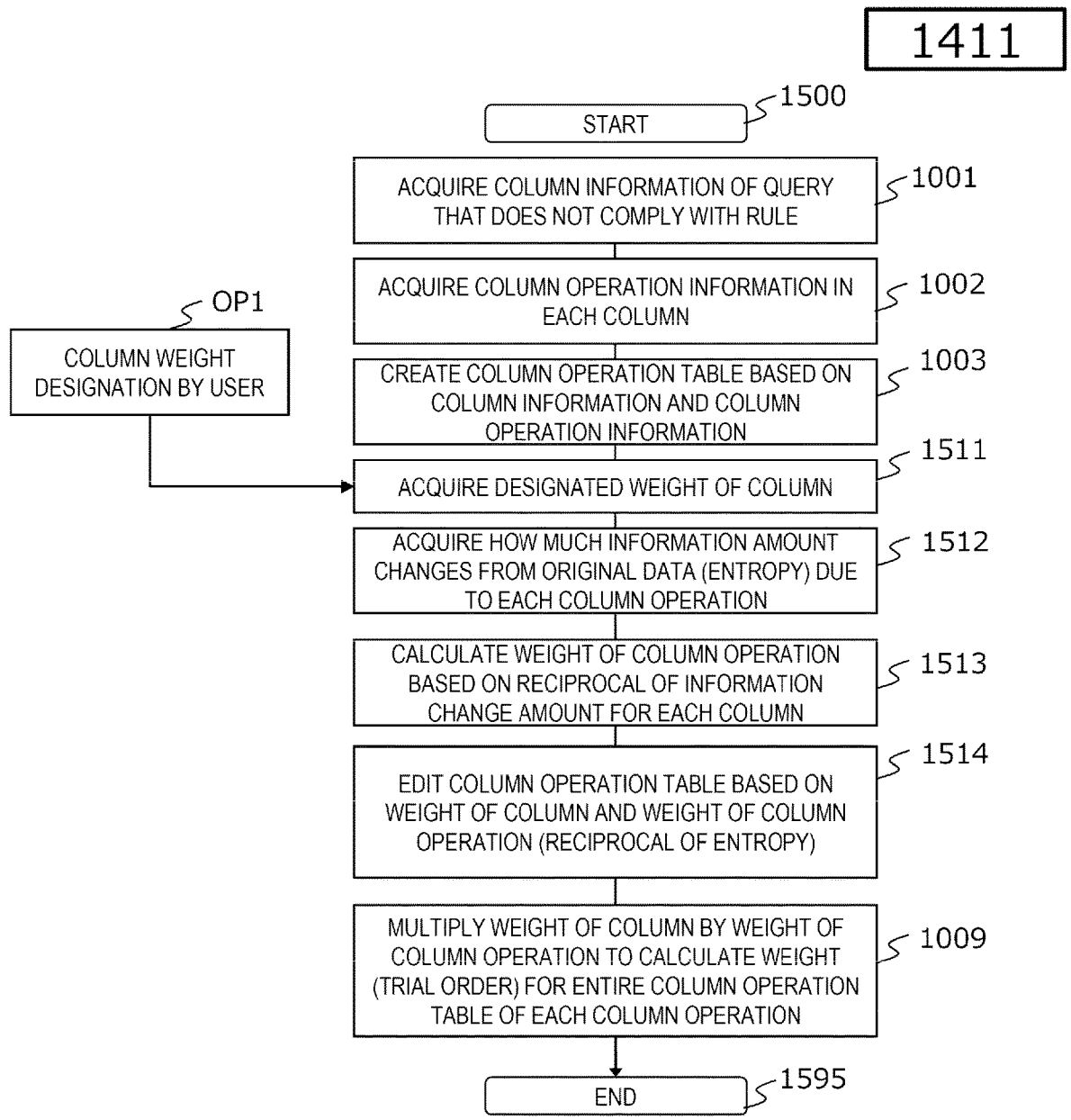
FIG. 15 is a flowchart illustrating a processing flow executed by the update proposing unit.

When the update proposing unit 21 proceeds to step 1411, the update proposing unit 21 executes processing in FIG. 15 to create the column operation table 26a based on the weight $w_j$ of a column designated in advance by column weight designation OP1 and an information change amount by the column operation. The processing in FIG. 15 will be described in detail later. The column weight designation OP1 is executed by the data user based on the information input from the input unit 307. For example, the column weight designation OP1 is executed as follows. In a client terminal, a weight designation screen 1420 illustrated in FIG. 14B constituting a GUI is displayed. FIG. 14B is a diagram illustrating an example of a screen (image) displayed on the output unit 308 (display unit) connected to the client terminal 3. As illustrated in FIG. 14B, a column weight input field 1421 and an execution button 1422 are included. A weight (a numerical value indicating a weight) for each column is input to the column weight input field 1421 from the input unit 307 by a user operating the input unit 307. The execution button 1422 is a button having an image. When the execution button 1422 is operated, the weight for each column input to the column weight input field 1421 is designated.

Thereafter, the update proposing unit 21 executes the processing in steps 904 to 909 described above, and then proceeds to step 1495 to temporarily end the present processing flow. Thereafter, the processing returns to FIG. 8A, and proceeds to step 808 in FIG. 8A.

FIG. 15 is a flowchart illustrating a processing flow executed by the update proposing unit 21. When the update proposing unit 21 proceeds to step 1411 in FIG. 14, the update proposing unit 21 starts the processing from step 1500 in FIG. 15 and sequentially executes the processing in steps 1001 to 1003 described above. Thereafter, the update proposing unit 21 sequentially executes the processing in step 1511 to step 1514 described below and in step 1009 described above, and then proceeds to step 1595 to temporarily end the present processing flow. Thereafter, the process returns to FIG. 14A, and proceeds to step 904.

Step 1511: The update proposing unit 21 acquires the weight of the column designated by the column weight designation OP1.

Step 1512: The update proposing unit 21 refers to the column operation management table 25 to acquire entropy (information change amount) by the column operation.

Step 1513: The update proposing unit 21 calculates a reciprocal of the entropy by each column operation, and calculates the weight $w_{ij}$ of the column operation such that the larger the reciprocal of the calculated entropy is, the larger the calculated weight $w_{ij}$ of the column operation is.

Step 1514: The update proposing unit 21 edits the column operation table 26a. That is, the update proposing unit 21 edits the column operation table 26a such that the columns of the column operation table 26a are arranged from the left in a descending order of the weight $w_j$ of the column, and the column operations are arranged from the top in a descending order of the reciprocal of the entropy.

Thereafter, the update proposing unit 21 proceeds to step 1009 and executes the processing in step 1009 described above to calculate the weight $W_{ij}$. The weight $W_{ij}$ is calculated such that, in the column operation, the larger the reciprocal of the entropy (that is, the smaller the information change amount by the column operation) is, the more important the weight $W_{ij}$ is. Then, an order of magnitudes of the weight $W_{ij}$ in the column operation table 26a is adopted as the trial order of the column operation in step 904 described above. Therefore, when it is determined that the query created by the data user violates the rule, an alternative query that has a small amount of information lost due to the data operation and does not violate the rule is more easily (efficiently) proposed.

Effects

As described above, the data management apparatus according to the fourth embodiment of the invention can more quickly (efficiently) propose, as an alternative, a query that complies with a data utilization intention of the data user, has a small amount of information lost due to the data operation, and does not violate the rule.

Modification

The invention is not limited to the above embodiments, and various modifications can be made within the scope of the invention. In addition, the above embodiments can be combined with each other without departing from the scope of the invention.

For example, in the information processing system 1 according to each of the above embodiments, an apparatus having the functions of the data processing server 2 and the database management server 4 may include one or a plurality of information processing apparatuses. In the information processing system 1 according to each of the above embodiments, an apparatus having the functions of the data processing server 2 and the client terminal 3 may include one or a plurality of information processing apparatuses. In the information processing system 1 according to each of the above embodiments, an apparatus having the functions of the client terminal 3 and the database management server 4 may include one or a plurality of information processing apparatuses. In the information processing system 1 according to each of the above embodiments, an apparatus having the functions of the data processing server 2, the client terminal 3, and the database management server 4 may include one or a plurality of information processing apparatuses.

For example, in each of the first embodiment to the third embodiment, the weight $w_j$ of a specific column, the weight $w_{ij}$ of a column operation, and the weight $W_{ij}$ may be modified by the operation input by the user.

In each of the above embodiments, the update proposing unit 21 creates the operation trial list 26b by sequentially adding the column operations, but the operation trial list 26b may be created in single processing. In this case, for example, the following processing may be executed instead of the processing in step 904 and step 905 in FIG. 9A.

Step A: The update proposing unit 21 creates the operation trial list 26b in which a plurality of column operations from the column operation table 26a are stored such that the higher the weight $W_{ij}$ is, the higher the order of the trial order is, in single processing.

Step B: The update proposing unit 21 selects the column operations in a descending order of the trial order from the operation trial list 26b, and updates a query by including a description indicating the selected column operations in a query that is determined to violate the rule. In this case, when the determination result in step 908 is that the data scheduled to be generated by the updated query does not comply with the rule, the update proposing unit 21 determines "NO" in step 908, and returns to step B.

In each of the above embodiments, the rule compliance checking unit 22 may perform processing of checking whether the data actually generated by the query complies with the rule, instead of step 804 and step 805 in FIG. 8A.

In each of the above embodiments, step 809 in FIG. 8A may be omitted.

In each of the above embodiments, the following determination processing may be added between step 905 and step 906 in each of FIGS. 9A and 14A.

Determination Processing: The update proposing unit 21 refers to the operation trial list 26b and the column operation management table 25 to calculate a total value of the entropy of the column operation of the updated query. The update proposing unit 21 determines whether the calculated total value of the entropy is smaller than preset threshold entropy.

When the total value of the calculated entropy is equal to or greater than the threshold entropy in the determination processing, an information change amount in the case where the updated query is executed may exceed a range intended by the original query. Therefore, in this case, the update proposing unit 21 determines "NO" in the determination processing, and proceeds to step 995 to temporarily end the processing flow in FIG. 9A (FIG. 14A).

On the other hand, when the total value of the calculated entropy is smaller than the threshold entropy in the determination processing, the update proposing unit 21 determines "YES" in the determination processing and proceeds to step 906.

When the total value of the calculated entropy is equal to or greater than the threshold entropy in the determination processing, the following processing may be executed instead of the above processing. Accordingly, even when the total value of the calculated entropy is equal to or greater than the threshold entropy, the update proposing unit 21 can verify another alternative query candidate in a range in which the total value of the entropy of the column operation is smaller than the threshold entropy.

The update proposing unit 21 deletes a last line of the operation trial list 26b created at the present time, and changes the trial order (for example, changes the trial order in an ascending order of the weight $W_{ij}$). Thereafter, the update proposing unit 21 executes processing in step B1 similar to step B described above, then sequentially executes the processing in step 906 and step 907, and then proceeds to step 908. When the determination result in step 908 is that the data scheduled to be generated by the updated query does not comply with the rule, the update proposing unit 21 determines "NO" in step 908, and returns to step B1.

In each of the above second embodiment and the third embodiment, the attributes of the data operation are the purpose of the data user, the project in which the data user is participating, and the data user, but the attributes of the data operation may be any one or two of these attributes. In addition, the attributes of the data operation may be attributes in which an attribute other than these attributes is added. The attributes of the data operation may be attributes in which at least one of these attributes is replaced with another attribute.

What is claimed is:

1. A data management apparatus comprising:
   an information processing apparatus including a processor to which a query for operating a database is input, the processor being configured to generate data based on the database by using the query; and
   a storage apparatus having a processor configured to store an operation trial list in which column operations that are data operations on columns of the database are associated with trial orders, wherein
   the processor of the information processing apparatus is coupled to a memory storing instructions that when executed configure the processor of the information processing apparatus to:

generate, when the data generated based on the database by using the query violates a rule that is a data handling regulation of the database, an alternative query candidate that is a candidate of an alternative query to replace the query, and determine whether the alternative query candidate violates the rule by determining whether data generated based on the database by using the alternative query candidate complies with the rule, generate, when the alternative query candidate does not violate the rule, data based on the database by using the alternative query candidate as the alternative query, and each time it is determined that the alternative query candidate violates the rule, generate a new alternative query candidate by adding, in the trial order of the operation trial list, a description indicating a column operation associated with the trial order to the alternative query candidate that is determined to violate the rule, and determine whether the generated new alternative query candidate violates the rule.

2. The data management apparatus according to claim 1, further comprising:

the processor of the storage apparatus being configured to store history information related to execution of a past query, wherein the processor of the information processing apparatus is configured to generate, when the alternative query candidate violates the rule, a new alternative query candidate including a description of the past query based on an operation performance by using the history information, and determine whether the generated new alternative query candidate violates the rule.

3. The data management apparatus according to claim 1, wherein column operation management information in which a column and a column operation are associated with each other is stored in the storage apparatus, and the processor of the information processing apparatus is configured to specify, when the data generated based on the database by using the query violates the rule, a column of the database related to the rule violation, and acquire one or more column operations corresponding to the specified column by applying the specified column to the column operation management information, generate, by using the specified column as an item of a column, a column operation table that is information in a table format in which the acquired one or more column operations are stored in the column of the item, and calculate a weight for the column operation that is an element of the column operation table, and create the operation trial list such that the higher the weight of the column operation is, the higher the order of the trial order corresponding to the column operation is.

4. The data management apparatus according to claim 3, wherein the processor of the storage apparatus is configured to store history information related to execution of a past query, which is history information including the number of times of reference to a column of the database referred to by past column operations and the number of times of operation of a column operation, which is the number of times the past column operations are applied to the database, and the processor of the information processing apparatus is configured to calculate the weight by multiplying a first weight for a column of the column operation table by a second weight for a column operation of the column operation table, and calculate the first weight for the column of the column operation table such that the first weight is increased as the number of times of reference to the column in the history information increases, and calculate the second weight for the column operation of the column operation table such that the second weight is increased as the number of times of operation of the column operation in the history information corresponding to the column operation increases.

5. The data management apparatus according to claim 4, wherein the history information further includes information including an attribute of the past column operations, and the processor of the information processing apparatus is configured to correct the number of times of reference to the column and the number of times of operation of the column operation by using the attribute of the column operation, and calculate the first weight based on the corrected number of times of reference to the column, and calculate the second weight based on the corrected number of times of operation of the column operation.

6. The data management apparatus according to claim 5, wherein the processor of the information processing apparatus is configured to correct the number of times of reference to the column by calculating the number of times of reference to the column included in the history information by weighting the number of times such that the later the reference time when comparing within a group having a common attribute of the past column operations, the greater the number, and correct the number of times of operation of the column operation by calculating the number of times of operation of the column operation included in the history information by weighting the number of times such that the later the operation time when comparing within a group having a common attribute of the past column operations, the greater the number.

7. The data management apparatus according to claim 5, wherein, the processor of the information processing apparatus is configured to based on a similarity between an attribute of a column operation corresponding to the query for which the generated data violates the rule and an attribute of the past column operations, in units in which the attribute of the past column operations is common, correct the number of times of reference to the column by calculating the number of times of reference to the column included in the history information by weighting the number of times such that the number increases as the similarity increases, and correct the number of times of operation of the column operation by calculating the number of times of operation of the column operation included in the history information by weighting the number of times such that the number of times increases as the similarity increases.

8. The data management apparatus according to claim 3, further comprising:
an information input apparatus including a processor configured to input information to the information processing apparatus by being operated by a user, wherein
the processor of the information processing apparatus is configured to
calculate the weight by multiplying a first weight for a column of the column operation table input from the information input apparatus by a second weight for a column operation of the column operation table, which is calculated based on an information change amount in each column of the database due to a column operation set in advance such that the second weight increases as the information change amount decreases.

9. The data management apparatus according to claim 1, wherein
the processor of the information processing apparatus is configured to
display, on a display unit, an alternative query display screen that includes an image indicating the alternative query in which a changed point from the query is highlighted, and serves as a GUI screen for allowing a user to determine execution of the alternative query.

10. The data management apparatus according to claim 3, wherein
the processor of the information processing apparatus is configured to
display, on a display unit, an image including the column operation table, the operation trial list, and a rule violated by data scheduled to be generated based on the database by the query.

11. The data management apparatus according to claim 1, wherein
the processor of the information processing apparatus is configured to
estimate a statistical information value of data scheduled to be generated based on the database by the alternative query candidate, and determine, based on the estimated statistical information value, whether the data scheduled to be generated based on the database by the alternative query candidate complies with the rule.

12. The data management apparatus according to claim 2, wherein
the processor of the information processing apparatus is configured to
update, when the query is executed, the history information related to the execution of the past query by information related to execution of the query, and update, when the alternative query is executed, the history information related to the execution of the past query by information related to the alternative query.

13. A data management system comprising:
a data management apparatus including an information processing apparatus having a processor to which a query for operating a database is input from a client terminal, the processor of the information processing apparatus being configured to generate data based on the database by using the query
a storage apparatus having a processor configured to store an operation trial list in which column operations that are data operations on columns of the database are associated with trial orders, wherein
the processor of the information processing apparatus is coupled to memory storing instructions that when executed configure the processor of the information processing apparatus to:
generate, when the data generated based on the database by using the query violates a rule that is a data handling regulation of the database, an alternative query candidate that is a candidate of an alternative query to replace the query, and determine whether the alternative query candidate violates the rule by determining whether data generated based on the database by using the alternative query candidate complies with the rule,
generate, when the alternative query candidate does not violate the rule, data based on the database by using the alternative query candidate as the alternative query, and
each time it is determined that the alternative query candidate violates the rule, generate a new alternative query candidate by adding, in the trial order of the operation trial list, a description indicating a column operation associated with the trial order to the alternative query candidate that is determined to violate the rule, and determine whether the generated new alternative query candidate violates the rule.

14. A data management method using an information processing apparatus that includes a processor to which a query for operating a database is input, the processor of the information processing apparatus being configured to generate data based on the database by using the query, the data management method comprising:
storing an operation trial list in which column operations that are data operations on columns of the database are associated with trial orders, and
executing by the processor of the information processing apparatus, the steps of:
generating, when the data generated based on the database by using the query violates a rule that is a data handling regulation of the database, an alternative query candidate that is a candidate of an alternative query to replace the query, and determining whether the alternative query candidate violates the rule by determining whether data generated based on the database by using the alternative query candidate complies with the rule;
generating, when the alternative query candidate does not violate the rule, data based on the database by using the alternative query candidate as the alternative query, and
each time it is determined that the alternative query candidate violates the rule, generate a new alternative query candidate by adding, in the trial order of the operation trial list, a description indicating a column operation associated with the trial order to the alternative query candidate that is determined to violate the rule, and determine whether the generated new alternative query candidate violates the rule.

\* \* \* \* \*